(12) United States Patent
Harada et al.

(10) Patent No.: US 10,113,898 B2
(45) Date of Patent: Oct. 30, 2018

(54) LIQUID LEVEL DETECTOR FOR OPEN VESSEL AND CLOSED VESSEL

(71) Applicant: DENSO CORPORATION, Kariya, Aichi-pref. (JP)

(72) Inventors: Toshikazu Harada, Kariya (JP); Atusi Sakaida, Kariya (JP); Toshihisa Taniguchi, Kariya (JP); Norio Gouko, Kariya (JP); Yoshitaro Yazaki, Kariya (JP); Yoshihiko Shiraishi, Kariya (JP); Yasuhiro Tanaka, Kariya (JP); Keita Saitou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 199 days.

(21) Appl. No.: 15/032,535

(22) PCT Filed: Oct. 29, 2014

(86) PCT No.: PCT/JP2014/078721
§ 371 (c)(1),
(2) Date: Apr. 27, 2016

(87) PCT Pub. No.: WO2015/064618
PCT Pub. Date: May 7, 2015

(65) Prior Publication Data
US 2016/0273952 A1    Sep. 22, 2016

(30) Foreign Application Priority Data
Oct. 30, 2013 (JP) .................................. 2013-225554

(51) Int. Cl.
*G01F 23/22* (2006.01)

(52) U.S. Cl.
CPC .................................. *G01F 23/22* (2013.01)

(58) Field of Classification Search
CPC ........ G01F 23/22; G01F 23/24; G01F 23/246; G01F 23/247; G01F 23/248
See application file for complete search history.

(56) References Cited

U.S. PATENT DOCUMENTS

| 4,796,471 A * | 1/1989 | Sabin | G01F 23/22 |
| | | | 374/29 |
| 7,777,929 B2 * | 8/2010 | Zalevsky | G02B 6/02347 |
| | | | 359/237 |

(Continued)

FOREIGN PATENT DOCUMENTS

| JP | 2004025202 A | 1/2004 |
| JP | 4681127 B2 | 5/2011 |

(Continued)

*Primary Examiner* — Justin Olamit
(74) *Attorney, Agent, or Firm* — Harness, Dickey & Pierce, P.L.C.

(57) ABSTRACT

A liquid level detector includes: a detecting element having one surface and the other surface opposite to the one surface, the one surface being opposed to a liquid, while being parallel to a height direction of liquid level; a Peltier element provided on the other surface side of the detecting element; and a control unit performing a detection processing for a liquid level of the liquid. The Peltier element forms a heat flow passing through the detecting element from the other surface to the one surface, toward the liquid or a gas. The control unit calculates a liquid level on the basis of an output value of an electrical signal outputted according to the heat flow passing through the detecting element, and a relationship between an output value of the detecting element and a liquid level.

9 Claims, 23 Drawing Sheets

(56) References Cited

U.S. PATENT DOCUMENTS

| | | | | |
|---|---|---|---|---|
| 2008/0000511 A1* | 1/2008 | Kuroyanagi | ............ | H01L 35/30 |
| | | | | 136/201 |
| 2010/0095995 A1* | 4/2010 | Toyoda | .................. | H01L 35/22 |
| | | | | 136/200 |
| 2011/0083711 A1* | 4/2011 | Plissonnier | ............. | H01L 35/32 |
| | | | | 136/206 |
| 2015/0144171 A1 | 5/2015 | Taniguchi et al. | | |

FOREIGN PATENT DOCUMENTS

| | | |
|---|---|---|
| JP | 2014007376 A | 1/2014 |
| JP | 2014007408 A | 1/2014 |
| JP | 2014007409 A | 1/2014 |
| JP | 2014233347 A | 12/2014 |
| JP | 2015087230 A | 5/2015 |
| WO | WO-91/14926 A1 | 10/1991 |

* cited by examiner

OUTPUT VALUE (VOLTAGE VALUE)

OUTPUT VALUE (VOLTAGE VALUE)

OUTPUT VALUE (VOLTAGE VALUE)

LIQUID LEVEL DETECTOR FOR OPEN VESSEL AND CLOSED VESSEL

CROSS REFERENCE TO RELATED APPLICATIONS

This application is a U.S. National Phase Application under 35 U.S.C. 371 of International Application No. PCT/JP2014/078721 filed on Oct. 29, 2014 and published in Japanese as WO 2015/064618 A1 on May 7, 2015. This application is based on and claims the benefit of priority from Japanese Application No. 2013-225554 filed on Oct. 30, 2013. The entire disclosures of all of the above applications are incorporated herein by reference.

BACKGROUND OF THE INVENTION

Technical Field

The present disclosure relates to a liquid level detector.

Background Art

There are known liquid level detectors. For example, JP-B-4681127 discloses a liquid level detector as described below. This liquid level detector is configured to detect a bath level of a molten metal. Specifically, the liquid level detector has an open vessel, an upper part of which is open. The open vessel has a sidewall in which a plurality of thermocouples are embedded to measure a heat flux difference. From the measurement results, a bath level is calculated. The heat flux difference is a difference between a heat flux flowing from a molten metal (liquid) inside the vessel toward outside the vessel, and a heat flux flowing from a gas above the bath level toward outside the vessel. Being an open vessel, there is a temperature difference between the molten metal and the gas, causing a heat flux difference based on which a bath level can be calculated.

PTL 1 JP-B-4681127

In the case of a hermetically closed vessel, however, there is almost no temperature difference between a liquid and a gas inside the vessel, causing no heat flux difference, and hence the liquid level cannot be detected by the conventional art described above.

Moreover, as is apparent from the fact that the thermocouples are embedded in the sidewall of the vessel, with the technique disclosed in the patent literature mentioned above, the liquid level of a liquid inside the vessel is detected, but the liquid level of the liquid not contained in the vessel is not detected.

SUMMARY

The present disclosure provides a liquid level detector capable of detecting a liquid level, not only in an open vessel but also in a closed vessel, and further, detecting a liquid level of a liquid not contained in the vessel as well.

One typical example of a liquid level detector of the present disclosure includes: a detecting element having a first surface and a second surface opposite to the first surface, the first surface being opposed to a liquid to be detected, while being parallel to a height direction of liquid level; a heating means provided to a second surface side of the detecting element; a detection processing means performing a detection process for a liquid level of the liquid; a single sensor unit configured with a single detecting element, a length of the single detecting element in a height direction of liquid level being equal to a detection range of the liquid level; a plurality of first and second via holes formed in the detecting element and penetrating an insulating substrate of a thermoplastic resin in a thickness direction; and first and second interlayer connection members embedded in the detecting element while being formed in the first and second via holes with metals different from each other.

According to the liquid level detector set forth above, the heating means forms a heat flow passing through the detecting element from the second surface to the first surface, toward the liquid or a gas. The detecting element has a structure in which the first and second interlayer connection members are alternately connected in series, generates, in the first and second interlayer connection members alternately connected in series, an electromotive force corresponding to the heat flow passing through the detecting element, and outputs an electrical signal corresponding to the electromotive force to the detection processing means. The detection processing means calculates a liquid level on the basis of an output value of the detecting element, and a relationship between an output value of the detecting element and a liquid level.

Another typical example of a liquid level detector includes: a plurality of detecting elements each having a first surface and a second surface opposite to the first surface, the first surface being opposed to a liquid to be detected, while being parallel to a height direction of liquid level; a heating means provided to a second surface side of each of the plurality of detecting elements; a detection processing means performing a detection process for a liquid level of the liquid; a single sensor unit configured with the plurality of detecting elements, the plurality of detecting elements being juxtaposed in a height direction of liquid level across a detection range of liquid level; a plurality of first and second via holes formed in each of the plurality of detecting elements and penetrating an insulating substrate of a thermoplastic resin in a thickness direction; and first and second interlayer connection members embedded in each of the plurality of detecting elements while being formed in the first and second via holes with metals different from each other.

According to the liquid level detector set forth above, the heating means forms a heat flow passing through each of the plurality of detecting elements from the second surface to the first surface, toward the liquid or a gas. Each of the plurality of detecting elements generates, in the first and second interlayer connection members alternately connected in series, an electromotive force corresponding to the heat flow passing through the detecting element, and outputs an electrical signal corresponding to the electromotive force to the detection processing means. The detection processing means calculates a liquid level on the basis of a total output value of the plurality of detecting elements, and a relationship between a total output value of the plurality of detecting elements and a liquid level.

According to the typical examples of the present disclosure set forth above, a heat flow is formed, flowing from the heating means through the detecting element toward the liquid or the gas. Based on the magnitude of the heat flow passing through the detecting element, a liquid level is detected. In general, liquid has a thermal conductivity higher than that of gas. Accordingly, the heat flow passing through the detecting element becomes larger when flowing toward the liquid than when flowing toward the gas. Thus, the liquid level can be specified from the magnitude of the heat flow passing through the detecting element.

In this case, if there is no temperature difference between the liquid and the gas, a difference is generated between the magnitude of the heat flow flowing toward the liquid and the magnitude of the heat flow flowing toward the gas. Thus, according to the examples of the liquid level detectors set forth above, a liquid level can be detected not only in an open vessel but also in a closed vessel. In the examples of the liquid level detectors set forth above, a sensor unit can be provided to the outer surface of a sidewall of the vessel, or inside the vessel.

According to the examples of the liquid level detectors set forth above, the sensor unit can be used being immersed in the liquid, to detect a liquid level of a liquid not contained in the vessel.

It should be noted that the bracketed reference signs of the means described in this section and the claims are examples showing correspondence to specific means in the embodiments described later.

DETAILED DESCRIPTION OF THE PREFERRED EMBODIMENTS

With reference to the drawings, hereinafter will be described several embodiments of the present disclosure. In describing the following embodiments, components that are identical with or equivalent to each other are given the same reference signs.

First Embodiment

In the present embodiment, a liquid level detector of the present disclosure is applied to a vehicle fuel meter mounted to a vehicle.

Figure 1:
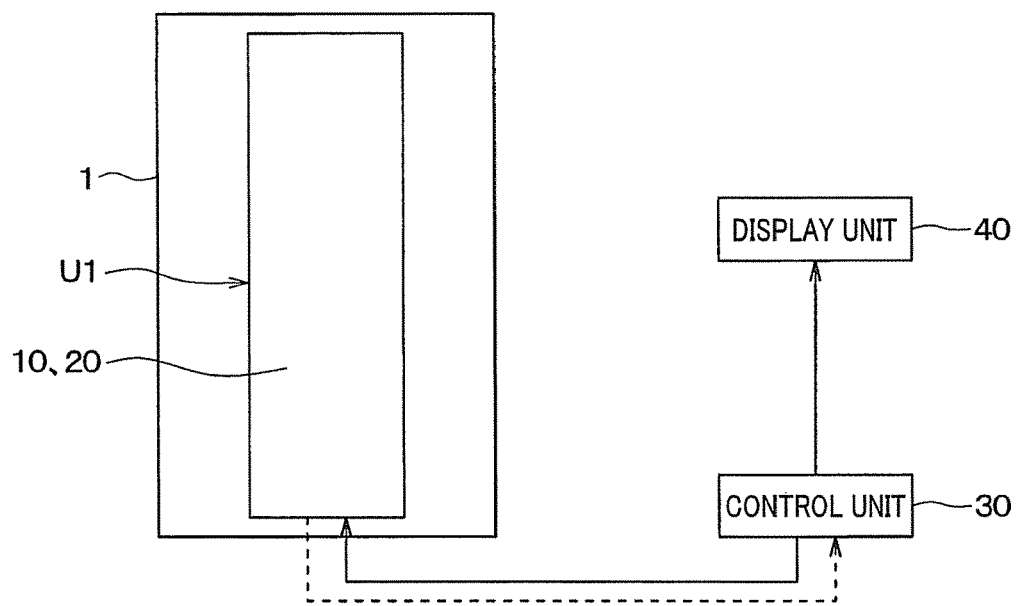
FIG. 1 is a diagram illustrating a configuration of a vehicle fuel meter according to a first embodiment.
Figure 2:
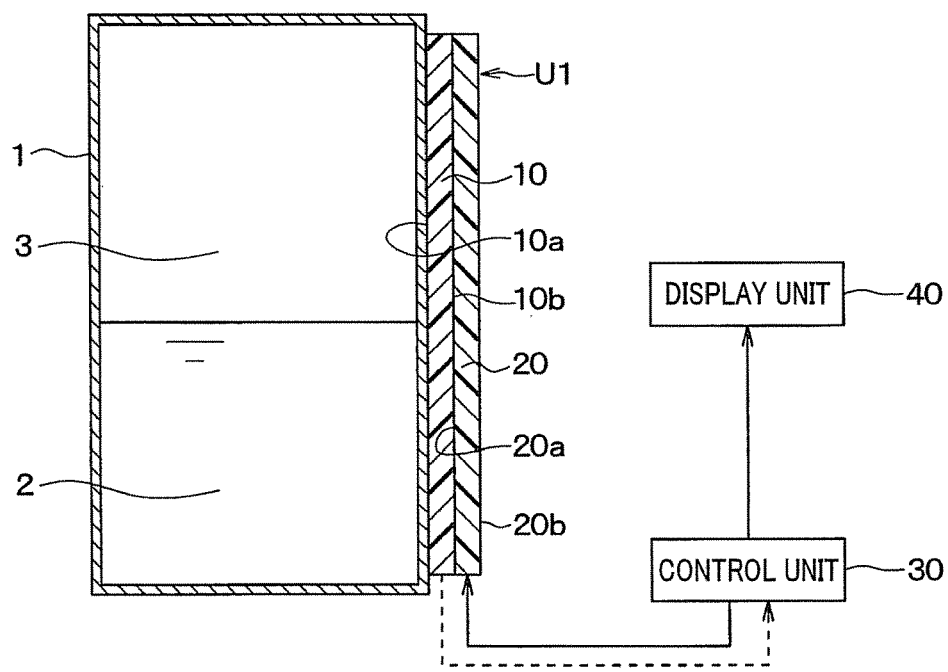
FIG. 2 is a diagram illustrating a configuration of the vehicle fuel meter according to the first embodiment.

As shown in FIGS. 1 and 2, the vehicle fuel meter includes a set of sensors 10 and 20, a control unit 30, and a display unit 40. The sensors 10 and 20 include a detecting element 10 and a Peltier element 20, and are provided to an outer surface of a sidewall of a vessel 1. In the present embodiment, the set of sensors 10 and 20 configures one sensor unit U1.

The vessel 1 is a closed vessel (hermetically closed vessel) having a rectangular parallelepiped shape and contains a liquid 2, i.e., a fuel, a liquid level of which is to be detected. The vessel 1 contains the liquid 2 and a gas 3 inside. Of four sidewalls of the vessel 1, one has an outer surface onto which the sensors 10 and 20 are stuck by means of an adhesive tape, an adhesive, or the like.

The detecting element 10 is a thermoelectric conversion element that generates an electromotive force corresponding to a temperature difference between both surfaces thereof. The detecting element 10 is in a plate shape with a thickness of 1 mm or less and in a rectangular shape in plan view. The detecting element 10 has one surface 10a (first surface) and the other surface 10b (second surface) opposite to the surface 10a. The detecting element 10 is stuck to the sidewall of the vessel 1, with the surface 10a being on the vessel 1 side, and the surface 10b being on an outer side. Specifically, the detecting element 10 is provided to the vessel 1 such that the surface 10a and the surface 10b are parallel to a height direction of the vessel 1 (i.e., up-and-down direction as viewed in FIG. 1 or 2).

The length of the detecting element 10 in a height direction of the vessel 1 is substantially the same as the overall height of the vessel 1. This is for detecting the liquid level throughout the inner height of the vessel 1. If the range over which the liquid level is desired to be detected is shorter than the overall height of the vessel 1, the length of the detecting element 10 may be made shorter than the overall height of the vessel 1. Thus, the length of the detecting element 10 is appropriately set according to the range over which the liquid level is desired to be detected.

The Peltier element 20 is provided to the surface 10b side, i.e., on the outer side, of the detecting element 10. The Peltier element 20 is a thermoelectric conversion element in a plate shape and has one surface 20a and the other surface 20b opposite to the surface 20a. Being applied with power, one of the surfaces 20a and 20b generates heat and the other of them absorbs heat. The Peltier element 20 is provided, with the surface 20a side being on the detecting element 10 side. The length of the Peltier element 20 in a height direction of the vessel 1 is equal to that of the detecting element 10.

Figure 3:
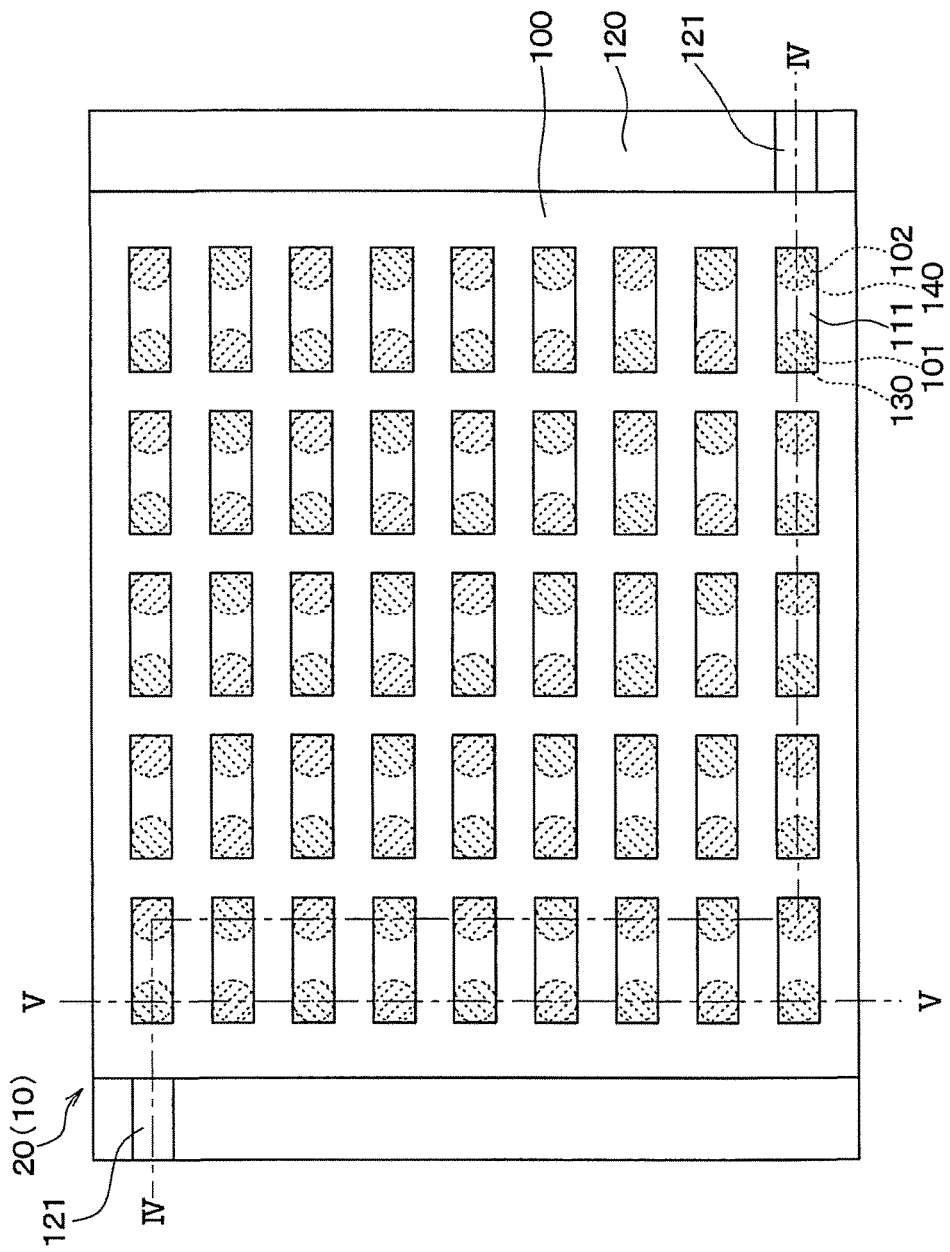
FIG. 3 is a plan view of a detecting element and a Peltier element illustrated in FIG. 2.
Figure 4:
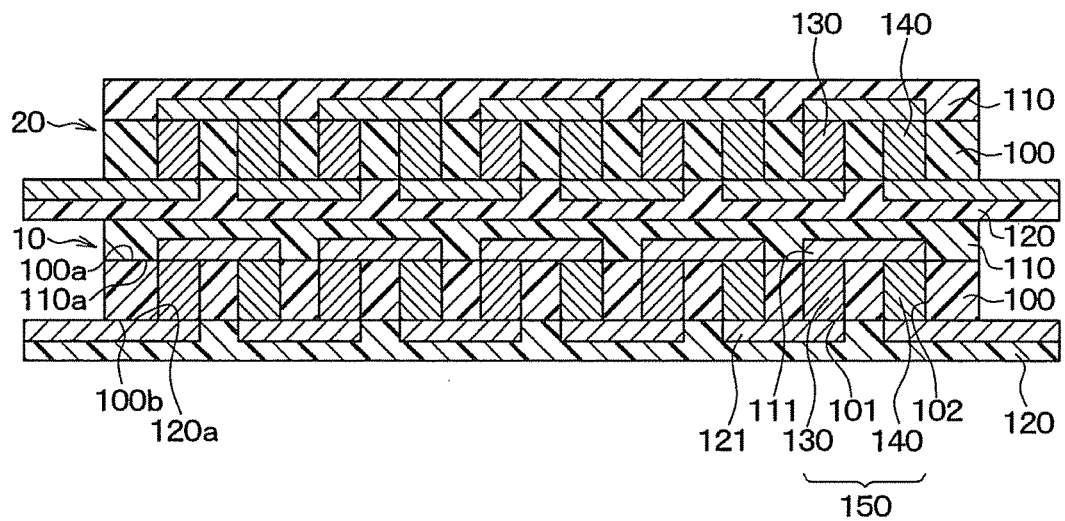
FIG. 4 is a cross-sectional view taken along a line IV-IV of FIG. 3.
Figure 5:
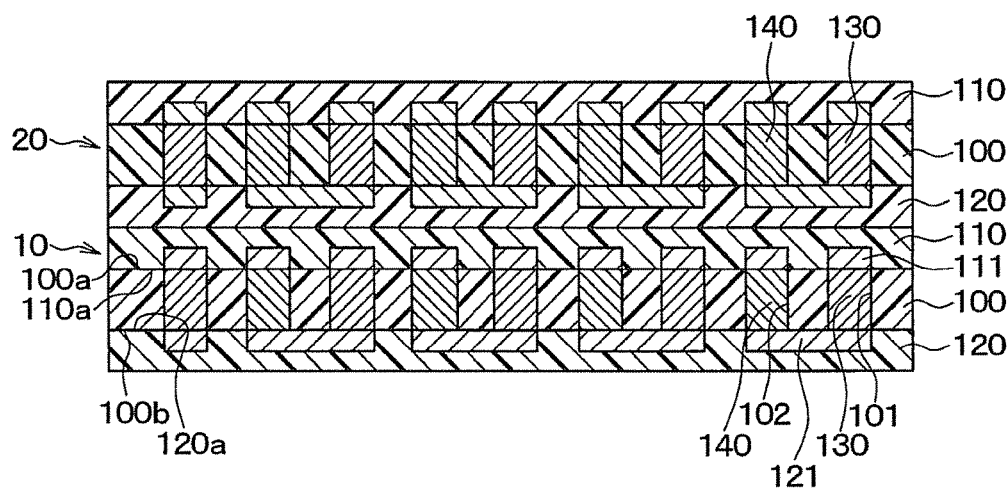
FIG. 5 is a cross-sectional view taken along a line V-V of in FIG. 3.

As shown in FIGS. 3 to 5, the Peltier element 20 has the same structure as that of the detecting element 10, and is laminated with the detecting element 10 for integration. Specifically, the detecting element 10 and the Peltier element 20 are formed into a laminate in which two thermoelectric conversion elements having the same structure are laminated with each other. In the laminate, one of the thermoelectric conversion elements is configured to serve as the detecting element 10, and the other, to serve as the Peltier element 20.

Specifically, as shown in FIGS. 3 to 5, the detecting element 10 and the Peltier element 20 are each an integration of an insulating substrate 100, a front surface protective member 110, and a back surface protective member 120. In the integration, first and second interlayer connection members 130 and 140 are alternately connected in series. For the sake of clarity, FIG. 3 shows the Peltier element 20, with its front surface protective member 110 being omitted. Although FIG. 3 is not a cross-sectional view, the first and second interlayer connection members 130 and 140 are hatched for the sake of clarity.

Since the detecting element 10 and the Peltier element 20 have the same structure, the following description sets forth the structure of the detecting element 10.

The insulating substrate 100 is configured with a thermoplastic resin film having rectangular shape in plan view which is typically made of a polyether ether ketone (PEEK), a polyetherimide (PEI), a liquid crystal polymer (LCP), or the like. A plurality of first and second via holes 101 and 102, which penetrate in a thickness direction, are formed being alternated to provide a staggered pattern.

The first and second via holes 101 and 102 of the present embodiment are each cylindrically shaped with a constant diameter from a front surface 100a toward a back surface 100b. However, the first and second via holes 101 and 102 may each have a tapered shape with a diameter decreasing from the front surface 100a toward the back surface 100b. Alternatively, the first and second via holes 101 and 102 may each have a tapered shape with a diameter decreasing from the back surface 100b toward the front surface 100a or may have a polygonal cylindrical shape.

The first via holes 101 are arranged, inside thereof, with the respective first interlayer connection members 130, and the second via holes 102 are arranged, inside thereof, with the respective second interlayer connection member 140. In other words, the first and second interlayer connection members 130 and 140 are disposed in the insulating substrate 100 in an alternating manner.

Thus, the first and second interlayer connection members 130 and 140 are disposed in the first and second via holes 101 and 102, respectively. Accordingly, by appropriately changing the number, the diameter, the spacing and the like of the first and second via holes 101 and 102, the first and second interlayer connection members 130 and 140 can be disposed with a high density. Thus, an electromotive voltage can be increased, and the detecting element 10 can be highly sensitive.

The first and second interlayer connection members 130 and 140 are configured with metals different from each other, so as to exhibit a Seebeck effect. For example, the first interlayer connection members 130 are each made of a metal compound obtained by solid-phase sintering a P-type Bi—Sb—Te alloy powder so as to maintain the same crystal structure of a plurality of metal atoms as before being sintered. The second interlayer connection members 140 are each made of a metal compound obtained by solid-phase sintering an N-type Bi—Te alloy powder so as to maintain the same crystal structure of a plurality of metal atoms as before being sintered. In this way, the metals forming the first and second interlayer connection members 130 and 140 are sintered alloys obtained by sintering a plurality of metal atoms in a state of maintaining the crystal structure of the metal atoms. This leads to increasing the electromotive voltage generated in the series of alternately connected first and second interlayer connection members 130 and 140, and enhancing the sensitivity of the detecting element 10.

Thus, the detecting element 10 having a high sensitivity is used in the present embodiment. Using such a detecting element 10, a liquid level can be detected.

The front surface protective member 110 configured with a thermoplastic resin film having a rectangular shape in plan view is disposed on the front surface 100a of the insulating substrate 100. The thermoplastic resin film is typically made of a polyether ether ketone (PEEK), a polyetherimide (PEI), a liquid crystal polymer (LCP), or the like. In plan view, the size of the front surface protective member 110 is the same as that of the insulating substrate 10. On the surface 110a side of the front surface protective member 110 that faces the insulating substrate 100, a plurality of front surface patterns 111, which are obtained by patterning a conductive foil such as a copper foil, are formed being apart from each other. Each of the front surface patterns 111 is electrically connected to the corresponding first and second interlayer connection members 130 and 140.

Specifically, as shown in FIG. 4, when one first interlayer connection member 130 and one second interlayer connection member 140 adjacent to each other are taken to be a pair 150, the first and second interlayer connection members 130 and 140 in each pair 150 are connected to a common front surface pattern 111. In other words, the first and second interlayer connection members 130 and 140 in each pair 150 are electrically connected to each other via the front surface pattern 111. In the present embodiment, the pair 150 is formed of one first interlayer connection member 130 and one second interlayer connection member 140 adjacent along a longitudinal direction of the insulating substrate 100 (right-and-left direction as viewed in FIG. 4).

The back surface protective member 120 configured with a thermoplastic resin film having a rectangular shape in plan view is disposed on the back surface 100b of the insulating substrate 100. The thermoplastic resin film is typically made of a polyether ether ketone (PEEK), a polyetherimide (PEI), a liquid crystal polymer (LCP), or the like. The back surface protective member 120 is ensured to have a length longer than that of the insulating substrate 100 in a longitudinal direction of the insulating substrate 100, and is disposed on the back surface 100b of the insulating substrate 100 such that both longitudinal ends thereof are projected from the insulating substrate 100.

On the surface 120a side of the back surface protective member 120 that faces the insulating substrate 100, a plurality of back surface patterns 121, which are obtained by patterning a conductive foil such as a copper foil, are formed being apart from each other. Each of the back surface patterns 121 is electrically connected to the corresponding first and second interlayer connection members 130 and 140.

Specifically, as shown in FIG. 4, in the pairs 150 adjacent in the longitudinal direction of the insulating substrate 100, the first interlayer connection member 130 in one pair 150 and the second interlayer connection member 140 in the other pair 150 are connected to a common back surface pattern 121. In other words, astride the pairs 150, the first and second interlayer connection members 130 and 140 are electrically connected via a common back surface pattern 121.

As shown in FIG. 5, on an outer edge of the insulating substrate 100, the first and second interlayer connection members 130 and 140 adjacent along a direction perpendicular to the longitudinal direction (i.e., up-and-down direction as viewed in FIG. 3) are connected to a common back surface pattern 121. Describing in detail, the adjacent first and second interlayer connection members 130 and 140 in the perpendicular direction are connected to a common back surface pattern 121 such that the first and second interlayer connection members 130 and 140 connected in series in a longitudinal direction of the insulating substrate 100 via the front surface patterns 111 and the back surface patterns 121 can be turned back.

Of the back surface patterns 121, as shown in FIGS. 3 and 4, portions at the ends of the serial connection mentioned above are formed being exposed from the insulating substrate 100. The portions of the back surface patterns 121 exposed from the insulating substrate 100 serve as terminals to be connected to the control unit 30.

The basic configuration of the detecting element 10 of the present embodiment is as described above. Such a detecting element 10 outputs, to the control unit 30, a sensor signal (electromotive voltage) corresponding to a heat flow (heat flux) flowing through the detecting element 10 in a direction perpendicular to both surfaces 10a and 10b. A change in the heat flux causes a change in the electromotive voltage generated in the serially and alternately connected first and second interlayer connection members 130 and 140.

On the other hand, in the Peltier element 20, one of the surfaces 20a and 20b generates heat and the other of them absorbs heat, by the control unit 30's supplying power to the serially and alternately connected first and second interlayer connection members 130 and 140. A heat-generating side and a heat-absorbing side depend on the direction of current passing through the serially and alternately connected first and second interlayer connection members 130 and 140.

The detecting element 10 and the Peltier element 20 of the present embodiment have flexibility owing to the thermoplastic resin forming the insulating substrate 100, the front surface protective member 110, and the back surface protective member 120. For this reason, if the sidewalls of the vessel 1 are curved, the detecting element 10 and the Peltier element 20 can be stuck to the outer surface of the vessel 1, in a state of being curved in conformity with the sidewall.

Figure 6:
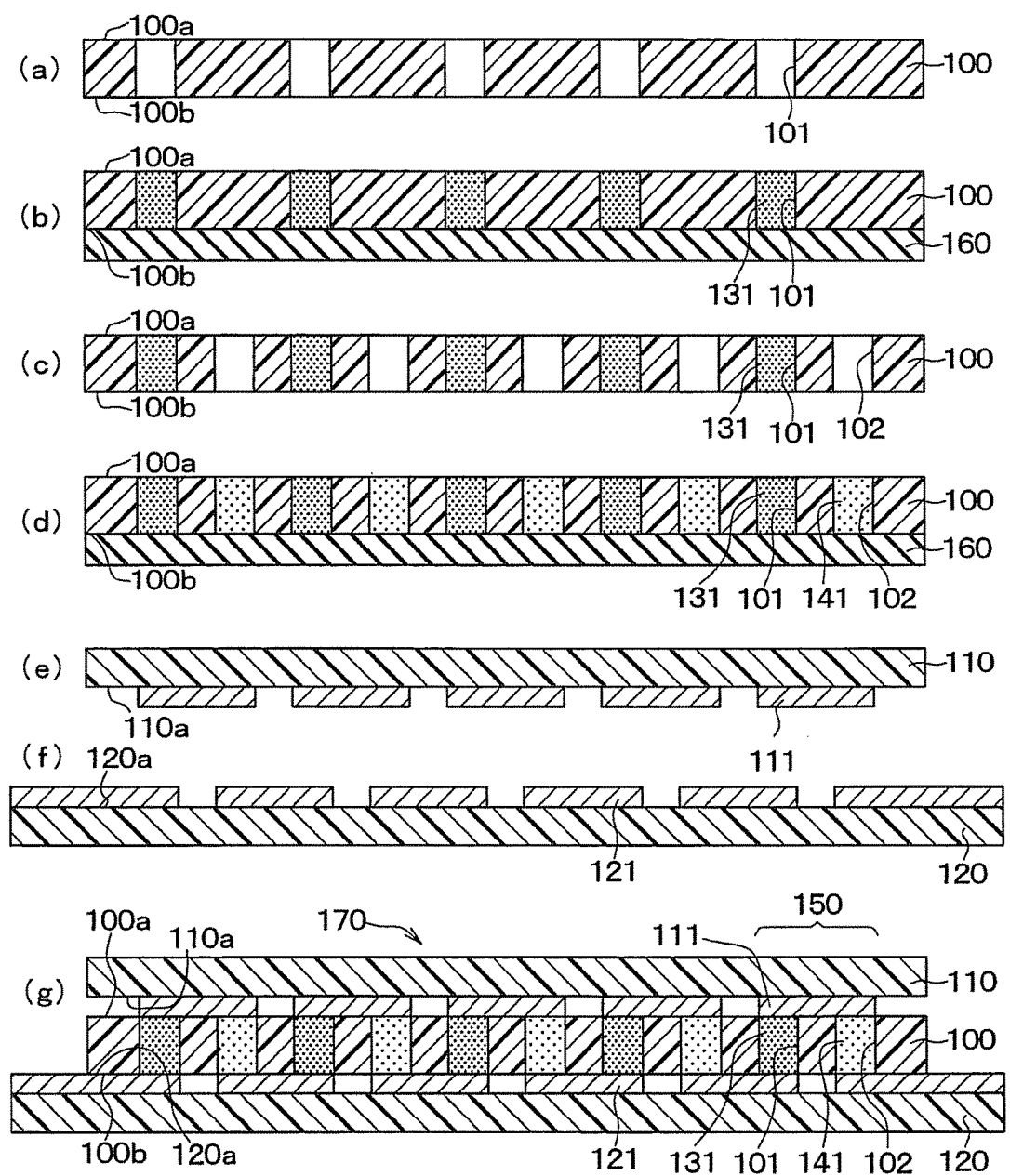
FIG. 6 is a set of cross-sectional views illustrating steps of fabricating the detecting element.

Referring now to FIG. 6, a method of fabricating the detecting element 10 and the Peltier element 20 will be described.

Firstly, as shown in FIG. 6(a), the insulating substrate 100 is provided and the plurality of first via holes 101 are formed by means of a drill, a laser, or the like.

Then, as shown in FIG. 6(b), the first via holes 101 are filled with a first conductive paste 131. As a method (device) for filling the first via holes 101 with the first conductive paste 131, the method described in Japanese Patent Application No. 2010-050356 filed by the present applicant may be employed.

Briefly describing the method, the insulating substrate 100 is arranged on a holding table, not shown, via absorption paper 160 such that the back surface 100b will be opposed to the absorption paper 160. Then, the first conductive paste 131, while being melted, is filled in the first via holes 101. Thus, most of an organic solvent in the first conductive paste 131 is adsorbed by the absorption paper 160, and the alloy powder is permitted to be intimately in contact with the first via holes 101.

The absorption paper 160 only has to be a material that is capable of adsorbing the organic solvent in the first conductive paste 131, and thus general high quality paper can be used. The material used for the first conductive paste 131 is a paste material obtained by adding an organic solvent, such as paraffin, having a melting point of 43° C., to a Bi—Sb—

Te alloy powder in which the metal atoms maintain a predetermined crystal structure. For this reason, the first conductive paste 131 is filled in the via holes in a state where the front surface 100a of the insulating substrate 100 is heated to approximately 43° C.

Subsequently, as shown in FIG. 6(c), the plurality of second via holes 102 are formed in the insulating substrate 100 by means of a drill, a laser, or the like. The second via holes 102 are alternated with the first via holes 101 as mentioned above and formed so as to configure a staggered pattern together with the first via holes 101.

Then, as shown in FIG. 6(d), the second via holes 102 are filled with a second conductive paste 141. This procedure can be similar to the one shown in FIG. 6(b).

That is, the insulating substrate 100 is again arranged on the holding table, not shown, via the absorption paper 160 such that the back surface 100b will be opposed to the absorption paper 160, followed by filling the second via holes 102 with the second conductive paste 141. Thus, most of an organic solvent in the second conductive paste 141 is adsorbed by the absorption paper 160 and the alloy powder is arranged in intimate contact with the second via holes 102.

The material used for the second conductive paste 141 is a pasted material obtained by adding an organic solvent, such as turpentine, having a melting point of room temperature, to a Bi—Te alloy powder (i.e. an alloy in which the metal atoms different from those constituting the first conductive paste 131 maintain a predetermined crystal structure). In other words, the material used for the organic solvent constituting the second conductive paste 141 is one having a melting point lower than that of the organic solvent constituting the first conductive paste 131. The second conductive paste 141 is filled in the via holes in a state where the front surface 100a of the insulating substrate 100 is retained to be room temperature. In other words, the second conductive paste 141 is filled in the via holes in a state where the organic solvent contained in the first conductive paste 131 is solidified. Thus, the second conductive paste 141 is prevented from being trapped in the first via holes 101.

The state where the organic solvent contained in the first conductive paste 131 is solidified refers to a state where, in the procedure of FIG. 6(b) mentioned above, the organic solvent remains in the first via holes 101 without being adsorbed by the absorption paper 160.

Then, in a procedure separate from the procedures mentioned above, as shown in FIGS. 6(e) and 6(f), a conductive foil, such as a copper foil, is formed on the surfaces 110a and 120a of the front and the back surface protective members 110 and 120, respectively, facing the insulating substrate 100. Then, by appropriately patterning the conductive foil, there are provided the front surface protective member 110 where the plurality of front surface patterns 111 are formed being spaced apart from each other, and the back surface protective member 120 where the plurality of back surface patterns 121 are formed being spaced apart from each other.

After that, as shown in FIG. 6(g), the back surface protective member 120, the insulating substrate 100, and the front surface protective member 110 are laminated in this order to constitute a laminate 170. In this case, taking the laminate 170 shown in FIG. 6(g) to be a single layer, a double layered state is created In the present embodiment, the back surface protective member 120 has a length in a longitudinal direction longer than that of the insulating substrate 100. Then, the back surface protective member 120 is arranged such that both end portions in a longitudinal direction are projected from the insulating substrate 100.

After that, the double-layer laminate 170 is arranged between a pair of press plates, not shown, and pressed while being heated in a vacuum state from above and below in a lamination direction to integrate the laminate 170. Specifically, the first and second conductive pastes 131 and 141 are solid-phase sintered to form the first and second interlayer connection members 130 and 140, respectively, which are then pressed while being heated (subjected to batch heating and pressing) so as to be connected to the front and back surface patterns 111 and 121, thereby integrating the double-layer laminate 170.

Although not particularly limited, in integrating the double-layer laminate 170, a buffer, such as a rock wool sheet, may be arranged between the laminate 170 and each of the press plates. The detecting element 10 and the Peltier element 20 are fabricated as described above.

The control unit 30 is a detection processing means performing a detection process for a liquid level, on the basis of a detection result of the detecting element 10. The control unit 30 is an electronic control unit, e.g. a microcomputer, configured with a memory as a storage means, and a peripheral circuit thereof, and performs a predetermined arithmetic processing according to a given program, to control an operation of the display unit 40.

The display unit 40 is a display means displaying a liquid level calculated by the control unit 30. The display unit 40 is configured with a display device, such as a monitor.

The following description sets forth a method of detecting a liquid level performed by the vehicle fuel meter of the present embodiment.

Figure 7:
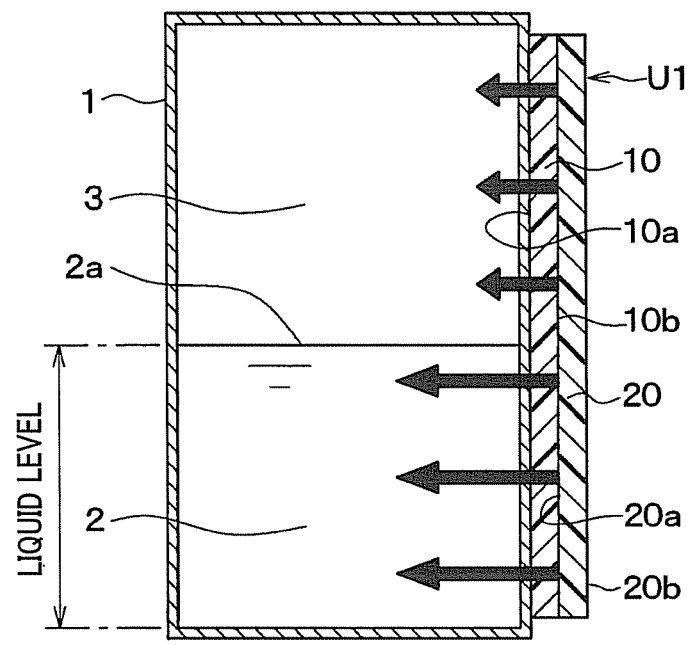
FIG. 7 is a cross-sectional view illustrating an operation of the detecting element and the Peltier element illustrated in FIG. 2.

As indicated by thick arrows in FIG. 7, the surface 20a of the Peltier element 20 is permitted to generate heat to form a heat flow from outside the vessel toward inside the vessel. Specifically, there is formed a heat flow flowing through the detecting element 10 from the surface 10b toward the surface 10a of the detecting element 10 and further toward the liquid 2 or the gas 3 in the vessel.

In this case, an amount of heat flow (magnitude of heat flow) flowing through the detecting element 10 differs between when flowing through the detecting element 10 toward the liquid and when flowing through the detecting element 10 toward the gas, due to difference in thermal conductivity between liquid and gas.

Specifically, when thermal conductivity is compared between a liquid layer and a gas layer, thermal conductivity of the former is generally higher than that of the latter. For this reason, the heat flow flowing through the detecting element 10 becomes larger when flowing therethrough toward the liquid, than when flowing therethrough toward the gas. For this reason, an output value (voltage value) of the detecting element 10 is larger when the vessel 1 is filled with the liquid 2 than when the vessel 1 is filled with the gas 3.

In the present embodiment, when the a liquid level 2a varies, a ratio also varies between a region facing the liquid 2 and a region facing the gas 3 in the surface 10a of the detecting element 10. Specifically, as the liquid level 2a becomes higher, the ratio of the region facing the liquid 2 is increased in the surface 10a of the detecting element 10, causing an increase in the heat flow flowing through the detecting element 10.

Figure 8:
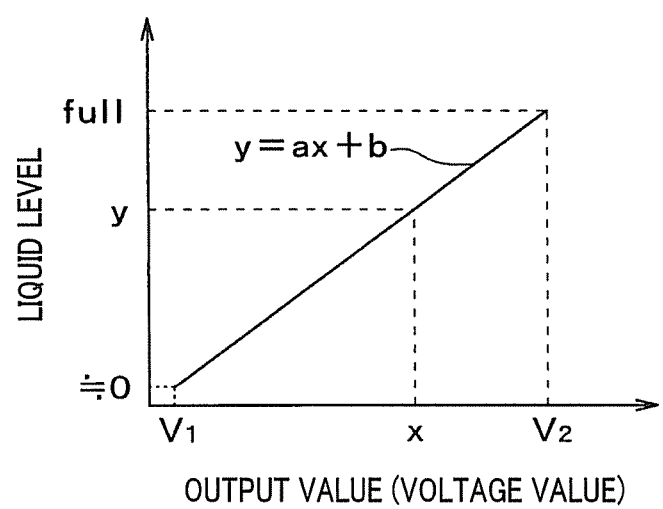
FIG. 8 is a diagram illustrating a relationship between an output value of the detecting element illustrated in FIG. 2 and a liquid level.

Accordingly, as shown in FIG. 8, when the ambient temperature of the vessel 1 is constant, such a relationship is established between a liquid level and an output value of the detecting element 10, in which a higher liquid level causes a larger output value (voltage value) of the detecting element 10. In other words, a linear relationship is established between a liquid level and an output value of the detecting element 10 as expressed by y=ax+b, where y is a liquid level, x is a voltage value, and a and b are predetermined constants. Therefore, based on the voltage value of the detecting element 10, and the relationship between a voltage value of the detecting element 10 and a liquid level, a liquid level can be calculated.

Figure 9:
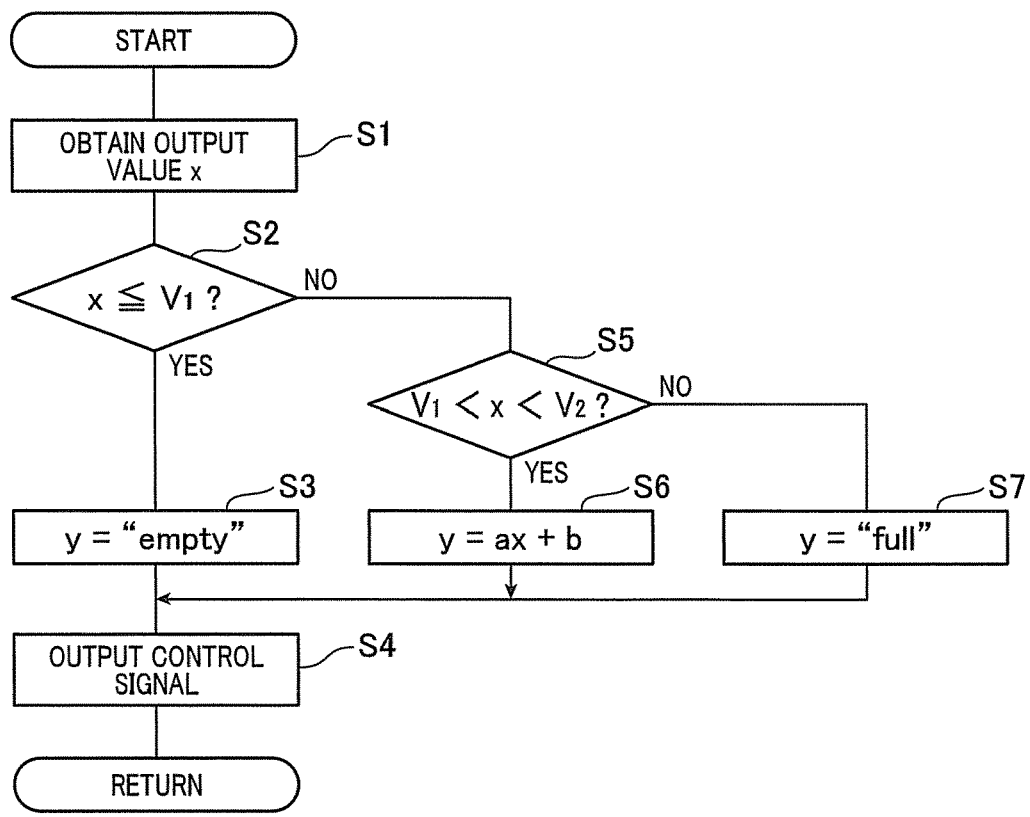
FIG. 9 is a flowchart of a control process executed by a control unit illustrated in FIG. 1 or 2.

The control unit 30 executes a control process shown in FIG. 9, as a liquid level detection process. This control process is started when an ignition switch or an engine starting switch is turned on, and cyclically executed thereafter. Each control step of FIG. 9 configures various function realizing means included in the control unit 30.

Firstly, before executing the control process shown in FIG. 9, the control unit 30 applies a predetermined voltage to the Peltier element 20 to cause the surface 20a of the Peltier element 20 to generate heat. The generated heat can constantly form a heat flow flowing through the detecting element 10 toward the liquid 2 or the gas 3 inside the vessel.

Then, at step S1, an output value (voltage value) x of the detecting element 10 is obtained.

Next, at step S2, it is determined whether or not the voltage value x, which has been obtained at step S1, is equal to or smaller than a first voltage value $V_1$. As shown in FIG. 8, the first voltage value $V_1$ is a voltage value when the liquid level is substantially 0.

Accordingly, if the liquid level is 0, the voltage value x is equal to or smaller than $V_1$, and hence an affirmative determination (YES) is made at step S2 and control proceeds to step S3. At step 3, it is determined that the liquid level is 0, i.e., the amount of residual fuel is 0 (empty). Next, at step S4, a control signal is outputted to the display unit 40 so as to cause the display unit 40 to display the determination made at step S3. Thus, the display unit 40 displays "empty".

On the other hand, if the liquid level is not 0, the voltage value x is larger than $V_1$, and hence a negative determination (NO) is made at step S2, and control proceeds to step S5.

At step S5, it is determined whether or not the voltage value x is smaller than a second voltage value $V_2$. As shown in FIG. 8, the second voltage value $V_2$ is a voltage value when the liquid level is maximum, i.e., when the vessel is filled up (full).

Therefore, if the liquid level is not maximum, the voltage value x is smaller than $V_2$, and hence an affirmative determination (YES) is made at step S5, and control proceeds to step S6. At step S6, the voltage value x, and the relational expression (y=ax+b) shown in FIG. 8 are used to calculate a liquid level y. Then, at step S4, a control signal is outputted to the display unit 40 so as to cause the display unit 40 to display the result calculated at step S6. Accordingly, the calculated liquid level is displayed on the display unit 40. The amount of residual fuel may be ensured to be calculated from the liquid level, and numerically displayed on the display unit 40.

On the other hand, if the liquid level is maximum, the voltage value x is $V_2$, and hence a negative determination (NO) is made at step S5 and control proceeds to step S7, where it is determined that the vessel is filled up (full). Next, at step S4, a control signal is outputted to the display unit 40 so as to cause the display unit 40 to display the determination made at step S3. Thus, the display unit 40 displays "full".

As described above, it is ensured, in the present embodiment, to form a heat flow flowing from the Peltier element 20 through the detecting element 10 toward the liquid 2 or the gas 3, and a liquid level is detected based on the magnitude of the heat flow passing through the detecting element 10. According to this, if there is no temperature difference between the liquid 2 and the gas 3, the liquid level of the liquid 2 inside the closed vessel 1 can be detected, because there is a magnitude difference between the heat flow toward the liquid 2 and the heat flow toward the gas 3.

In the conventional art described above, the thermocouples need to be embedded in a sidewall of the vessel. This raises a problem such as of not being able to repair the thermocouples in the occurrence of a failure. In contrast, according to the present embodiment, since the sensor unit U1 does not have to be embedded in a sidewall of the vessel, such a problem can be avoided.

Figure 10:
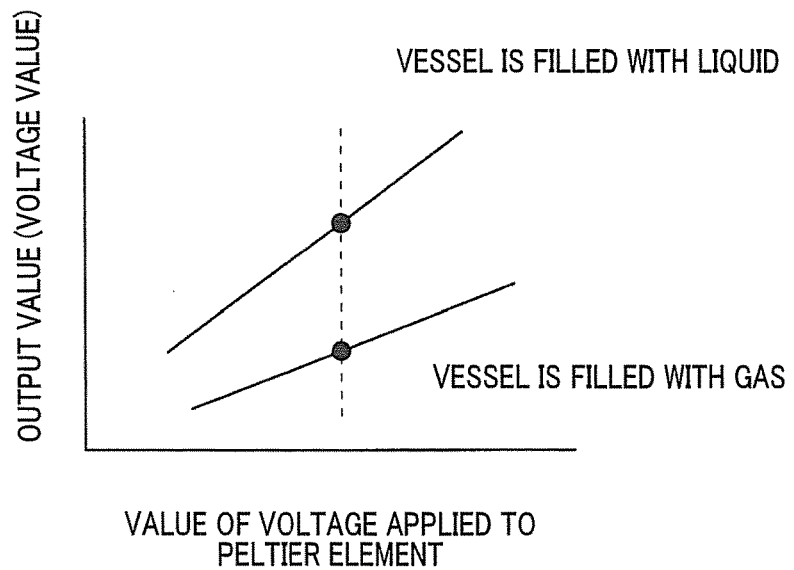
FIG. 10 is a diagram illustrating a relationship between an applied voltage value in the Peltier element and an output value of the detecting element illustrated in FIG. 2.

In the present embodiment, as shown in FIG. 10, as the voltage applied to the Peltier element 20 has a larger value, the output value (voltage value) of the detecting element 10 will have a larger value. Therefore, by optionally setting the value of the voltage applied to the Peltier element 20, the output sensitivity of the detecting element 10 can be adjusted. The relationship shown in FIG. 8 depends on the magnitude of the voltage applied to the Peltier element 20. For this reason, relational expressions as shown in FIG. 8 are obtained in advance through experiments according to the magnitudes of the voltage applied to the Peltier element 20, and stored in the memory. Then, according to the magnitude of a set voltage to be applied to the Peltier element 20, a relational expression to be used for calculation of the liquid level is ensured to be selected.

In the present embodiment, a predetermined voltage is constantly applied to the Peltier element 20. However, if constant measurement is not needed, a voltage may be intermittently applied to the Peltier element 20. Specifically, if the cycle of the control process shown in FIG. 9 is long, a voltage may be ensured to be applied to the Peltier element 20 every time the control process shown in FIG. 9 is executed. By doing so, a temperature rise of the vessel 1 can be minimized. In this case, however, the time until the heat flow becomes constant is longer.

Moreover, by changing the direction of current passing through the Peltier element 20 to switch between heat absorption and heat generation in the surface 20a of the Peltier element 20, a temperature rise of the vessel 1 can also be minimized. In this case, however, the sensitivity of the detecting element 10 becomes low.

Second Embodiment

Figure 11:
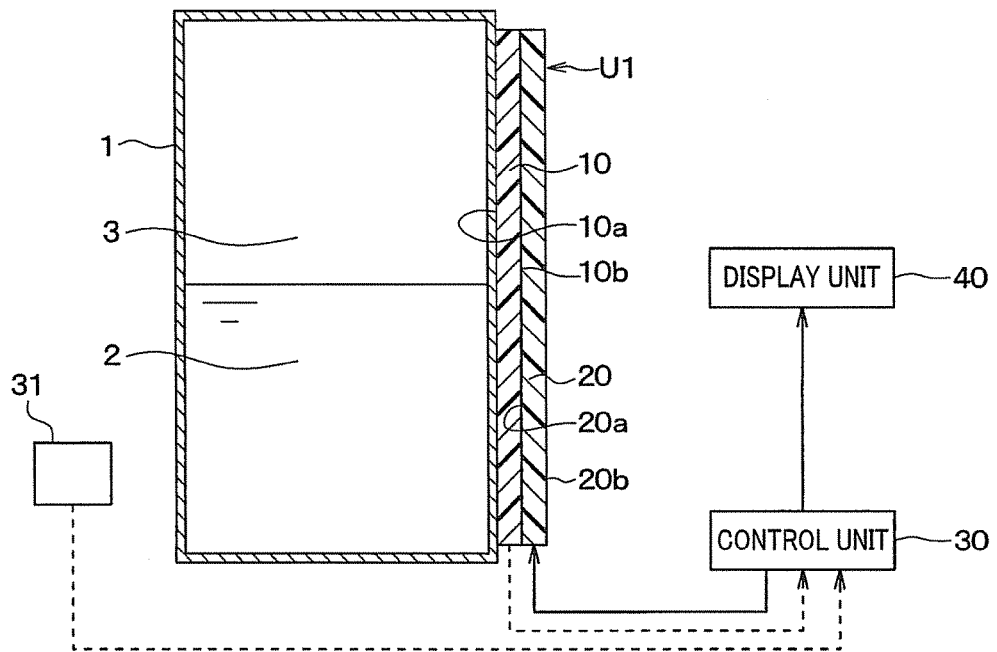
FIG. 11 is a diagram illustrating a configuration of a vehicle fuel meter according to a second embodiment.

As shown in FIG. 11, a vehicle fuel meter of the present embodiment is based on the vehicle fuel meter of the first embodiment, and additionally includes a temperature sensor 31. The rest of the configuration is similar to the first embodiment.

The temperature sensor 31 detects an ambient temperature (environmental temperature) of the vessel 1 and the sensors 10 and 20, and outputs a sensor signal corresponding to the detected temperature to the control unit 30. The temperature sensor 31 is provided independently of the sensors 10 and 20. The temperature sensor 31 is disposed near the vessel 1. As the temperature sensor 31, a thermocouple or the like can be used.

Figure 12:
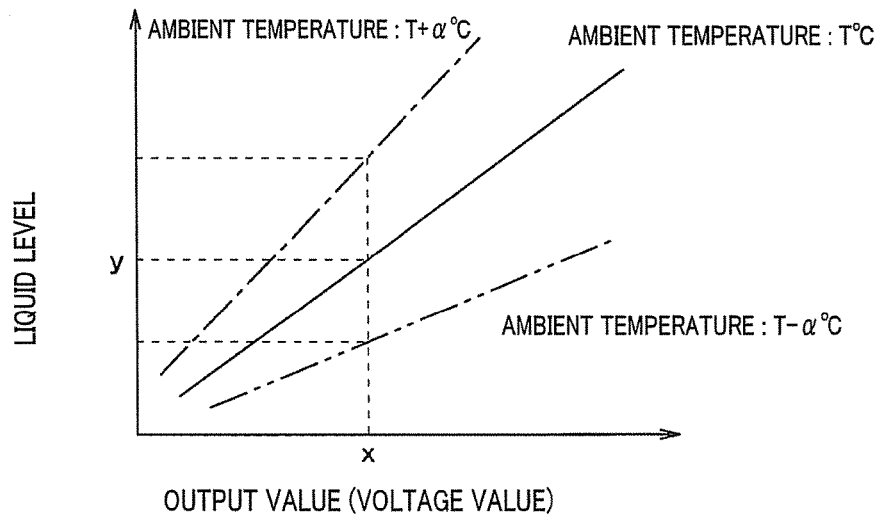
FIG. 12 is a diagram illustrating a relationship between an output value of a detecting element illustrated in FIG. 11 and a liquid level, when ambient temperatures are T° C., T$-\alpha$° C., and T$+\alpha$° C.

Under the conditions where the voltage applied to the Peltier element 20 is constant and the liquid level remains unchanged but the ambient temperature (environmental temperature) differs, the magnitude of the heat flow flowing through the detecting element 10 also differs. Thus, as shown in FIG. 12, the relationship between a liquid level and an output value (voltage value) of the detecting element 10 depends on the ambient temperature. Specifically, when the ambient temperature is higher than a standard temperature (T° C.) (T+α° C.), the heat flow becomes smaller than when the ambient temperature is the standard temperature. Therefore, the voltage value in this case becomes smaller for the same liquid level. On the other hand, when the ambient temperature is lower than the standard temperature (T° C.) (T-α° C.), the heat flow becomes larger than when the ambient temperature is the standard temperature. Therefore, the voltage value in this case becomes larger for the same liquid level.

For this reason, when the ambient temperature is not constant but changes, and the liquid level is calculated from the output value without taking account of the ambient temperature, there will be an error between the calculated liquid level and an actual liquid level.

Accordingly, the present embodiment calculates a liquid level on the basis of an ambient temperature measured by the temperature sensor 31, a voltage value of the detecting element 10, and a relationship between a voltage value of the detecting element 10 and a liquid level, which corresponds to the ambient temperature.

For example, for each of various ambient temperatures, a relationship between a voltage value of the detecting element 10 and a liquid level is obtained in advance by experiments. Based on a difference from the relationship between a voltage value of the detecting element 10 and a liquid level at the standard temperature (T° C.), necessary correction coefficients are determined in advance on an ambient-temperature basis and stored in the memory. When calculating a liquid level, the control unit 30 multiplies the voltage value of the detecting element 10 by the correction coefficient, and uses the relationship between a voltage value of the detecting element 10 and a liquid level at the standard temperature.

For example, for each of the various ambient temperatures, a relationship between a voltage value of the detecting element 10 and a liquid level is determined in advance by experiments, and stored in the memory. Then, when calculating a liquid level, the control unit 30 uses the relationship between a voltage value of the detecting element 10 and a liquid level, which corresponds to the ambient temperature measured by the temperature sensor 31.

By calculating a liquid level in this way, a liquid level can be detected correctly.

The vehicle fuel meter of the present embodiment may additionally include a temperature sensor that detects an internal temperature of the vessel 1. In this case, one temperature sensor may be used, or two temperature sensors may be used, one being for detecting the temperature of the liquid 2 and one being for detecting the temperature of the gas 3. Thus, a liquid level can be calculated on the basis of an ambient temperature, an internal temperature of the vessel, a voltage value of the detecting element 10, and a relationship between a voltage value of the detecting element 10 and a liquid level, corresponding to the ambient temperature and the internal temperature of the vessel. In this way, a liquid level can be detected more correctly.

Third Embodiment

Figure 13:
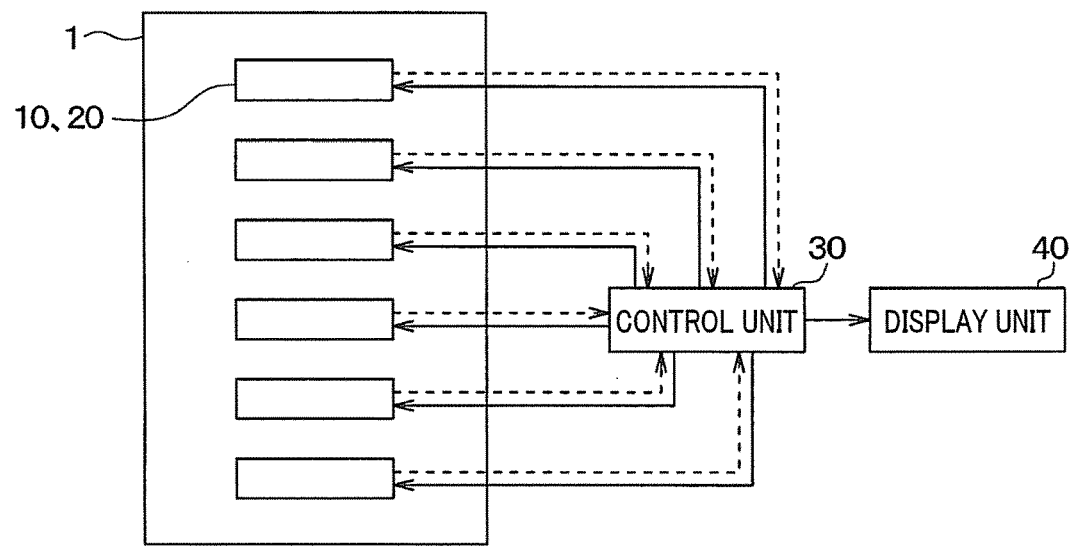
FIG. 13 is a diagram illustrating a configuration of a vehicle fuel meter according to a third embodiment.
Figure 14:
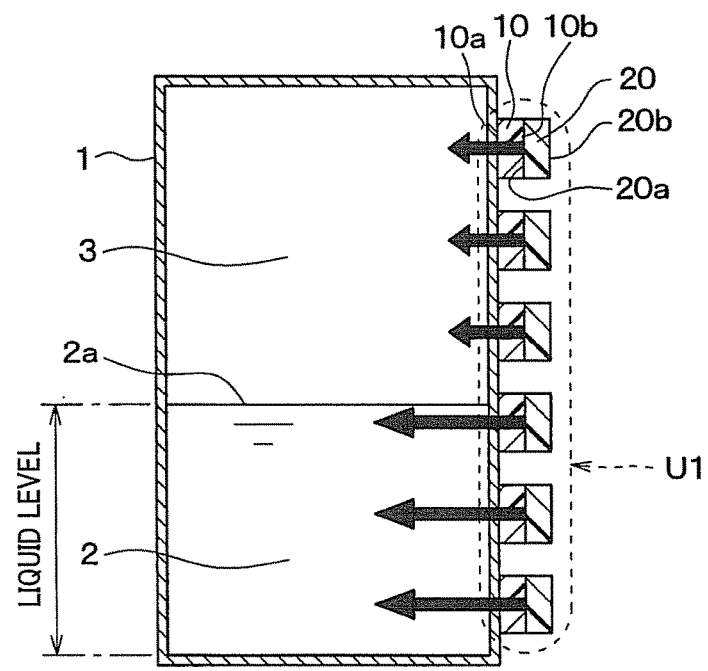
FIG. 14 is a cross-sectional view illustrating a vessel, a detecting element, and a Peltier element illustrated in FIG. 13.

As shown in FIGS. 13 and 14, a vehicle fuel meter of the present embodiment is based on the vehicle fuel meter of the first embodiment, and includes a plurality of sets of sensors 10 and 20 instead of a single set of sensors 10 and 20. The rest of the configuration is similar to the first embodiment.

In the present embodiment, six sets of sensors 10 and 20 are provided to the outer surface of a sidewall of the vessel 1. Each set of sensors 10 and 20 has the same structure as that of the set of sensors 10 and 20 of the first embodiment, with a length in a height direction of the vessel 1 being made shorter than that of the single set of sensors 10 and 20 of the first embodiment. The sets of sensors 10 and 20 are separate bodies and juxtaposed at a predetermined interval in a height direction of the vessel 1. The sets of sensors 10 and 20 are individually and electrically connected to the control unit 30 via wiring such as of wires or cables. This plurality of sets of sensors 10 and 20 configures one sensor unit U1.

The control unit 30 adds the output values (voltage values) of the detecting elements 10. The detecting elements 10 are connected to each other in series by wiring. In this configuration, a total output (total electromotive voltage) that is a sum of the outputs of the detecting elements 10 may be ensured to be inputted to the control unit 30.

Figure 15:
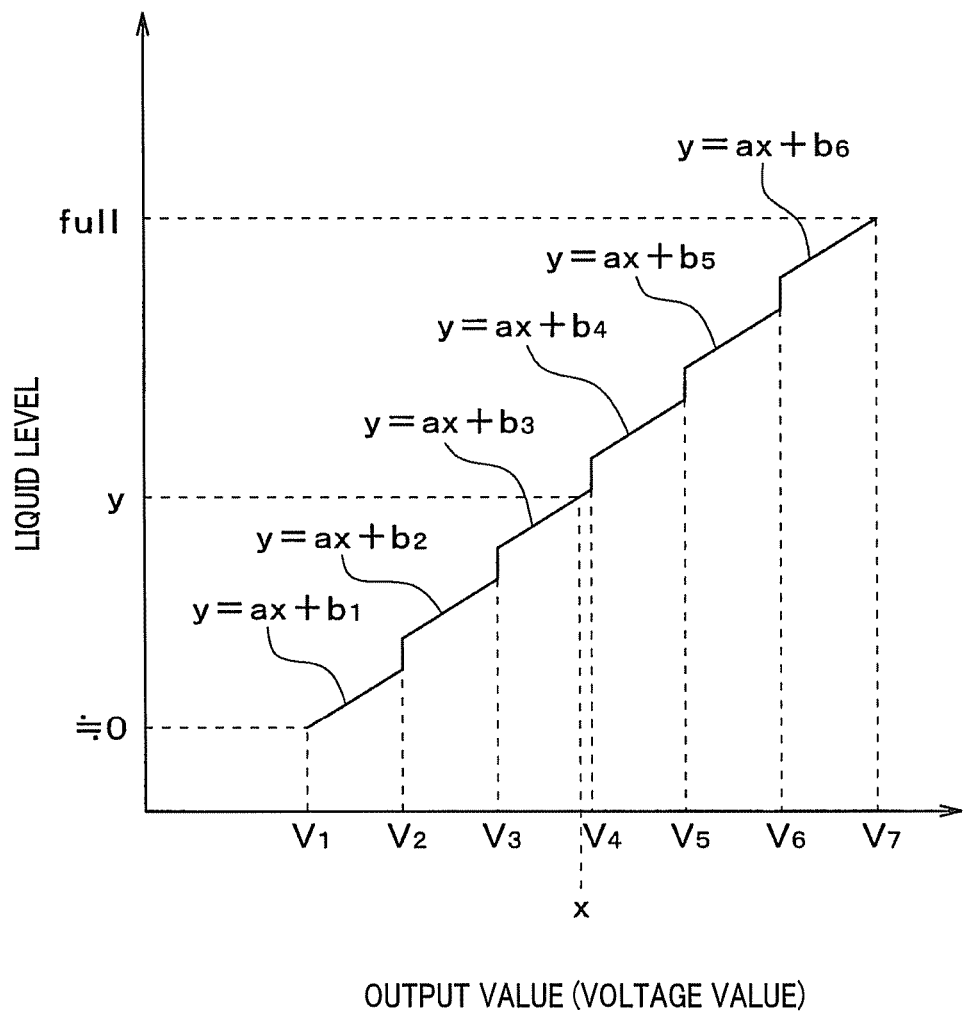
FIG. 15 is a diagram illustrating a relationship between a total output value of a plurality of detecting elements illustrated in FIG. 13 and a liquid level.

As shown in FIG. 15, in the vehicle fuel meter of the present embodiment as well, there is a relationship in which, when the ambient temperature of the vessel 1 is constant, a higher liquid level position leads to a larger total output value (total voltage value) of the detecting elements 10. Accordingly, a liquid level can be detected in a manner similar to the first embodiment.

However, in the present embodiment, if the liquid level 2a is between adjacent sets of sensors 10 and 20, the liquid level cannot be detected correctly. Specifically, when the liquid level 2a falls in a level range where any one set of sensors 10 and 20 is located, the liquid level and the total voltage value are in a proportional relationship, and hence the liquid level can be pinpointed from the total voltage value. However, when the liquid level 2a falls in a level range between adjacent sets of sensors 10 and 20, the total voltage value is constant regardless of the liquid level. As shown in FIG. 15, at voltage values $V_2$, $V_3$, $V_4$, $V_5$, and $V_6$, the liquid levels corresponding to these voltage values will each have a range. For this reason, the liquid level cannot be pinpointed from the total voltage value, but can only be determined to be within a range.

Figure 16:
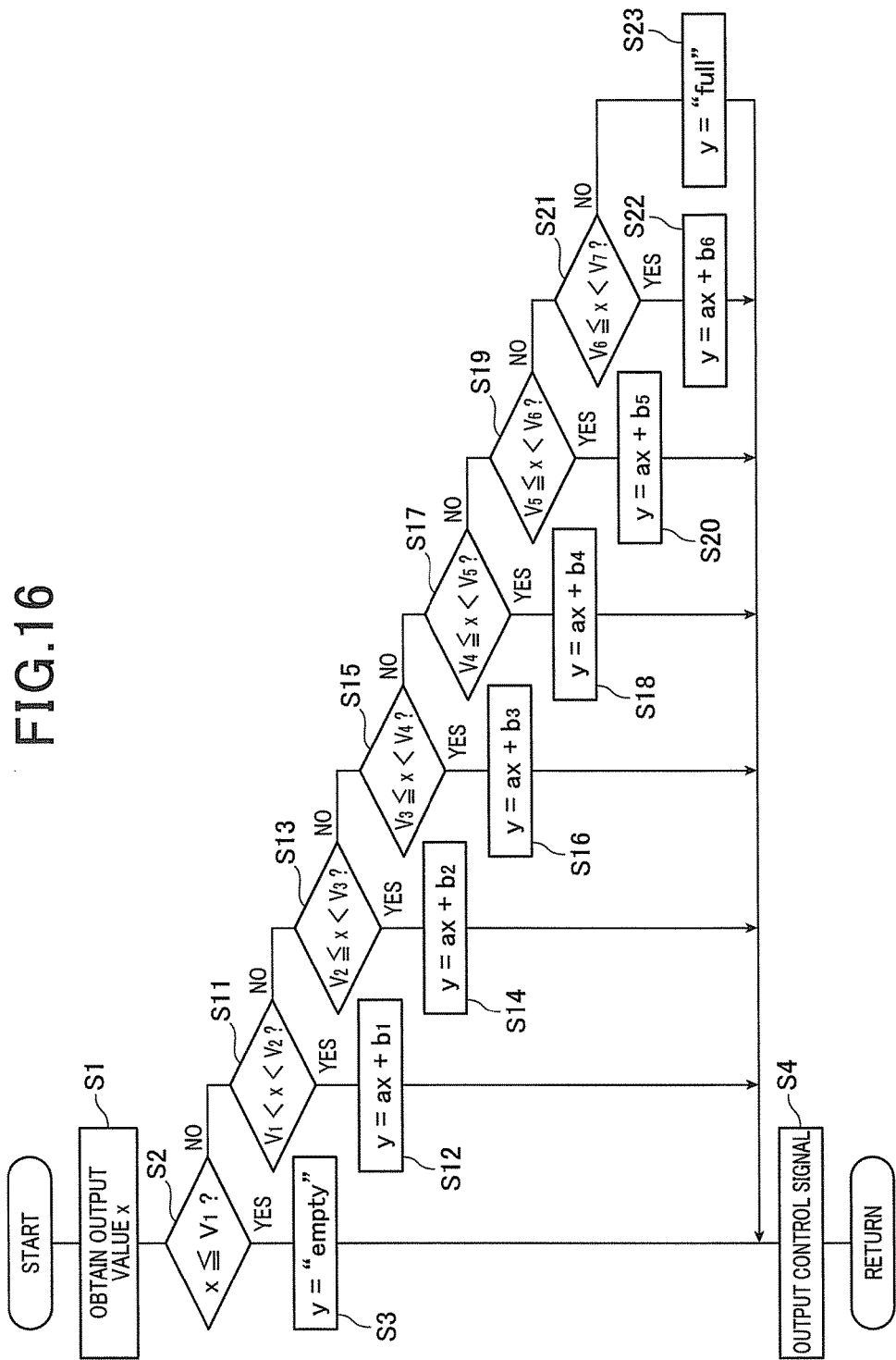
FIG. 16 is a flowchart illustrating a control process executed by a control unit illustrated in FIG. 13.

In the present embodiment, the control unit 30 executes a control process shown in FIG. 16, as a liquid level detection process. This control process is executed similar to the control process described in the first embodiment and shown in FIG. 9. The following description sets forth some differences from the control process shown in FIG. 9.

At step S2, if the liquid level is not 0, the voltage value x is larger than $V_1$, and hence a negative determination (NO) is made and control proceeds to step S11.

At step S11, it is determined whether or not the voltage value x is smaller than the second voltage value $V_2$ indicated in FIG. 15. If an affirmative determination (YES) is made, control proceeds to step S12, where $y=ax+b_1$ is used to calculate the liquid level y from the voltage value x obtained at step S1. On the other hand, if a negative determination (NO) is made, control proceeds to step S13, where it is determined whether or not the voltage value x is smaller than the third voltage value $V_3$ indicated in FIG. 15.

Thus, at steps S11, S13, S15, S17, S19, and S21, it is determined whether or not the voltage value x is smaller than the second to seventh voltage values $V_2$ to $V_7$. If an affirmative determination (YES) is made at each of the steps, the corresponding relational expression $y=ax+b_1$ to $y=ax+b_6$ is used at step S12, S14, S16, S18, S20 or S22 as shown in FIG. 15, to calculate the liquid level y. For example, when the liquid level 2a is as shown in FIG. 14, the voltage value x is the third voltage value $V_3$ inclusive, but less than the fourth voltage value $V_4$ as shown in FIG. 15, and hence $y=ax+b_3$ is used to calculate the liquid level y. Afterwards, at step S4, a control signal is outputted to the display unit 40, so that the display unit 40 can display the calculation result of step S6. Thus, the display unit 40 displays the calculated liquid level.

As shown in FIG. 15, if the liquid level is maximum, the voltage value x is the seventh voltage value $V_7$, and hence a negative determination (NO) is made at step S21. Then, control proceeds to step S23 where the vessel is determined to be filled up with the fuel (full). Next, at step S4, a control signal is outputted to the display unit 40, so that the display unit 40 can display the determination made at step S3. Thus, the display unit 40 displays "full".

In the vehicle fuel meter of the present embodiment, the liquid level does not need to be detected with high accuracy, but just needs to be detected roughly.

According to the present embodiment, since the plurality of sets of sensors 10 and 20 are used, the total area occupied by the sets of sensors 10 and 20 can be reduced compared to the case where a single set of sensors 10 and 20 is disposed throughout the detection range for liquid level.

According to the present embodiment, the plurality of sets of sensors 10 and 20 are disposed being spaced apart from each other. Accordingly, the plurality of sets of sensors 10 and 20 can be disposed if the vessel 1 has a distorted shape that disables arrangement of a single set of sensors 10 and 20 over a wide range of the outer surface of a sidewall of the vessel 1.

The size or the number of sets of sensors 10 and 20 can be changed as desired. It is preferable to downsize each set of sensors 10 and 20 and dispose a multiple sets of sensors to reduce the interval between adjacent sets of sensors 10 and 20. Thus, the liquid level can be detected with good accuracy.

Fourth Embodiment

Figure 17:
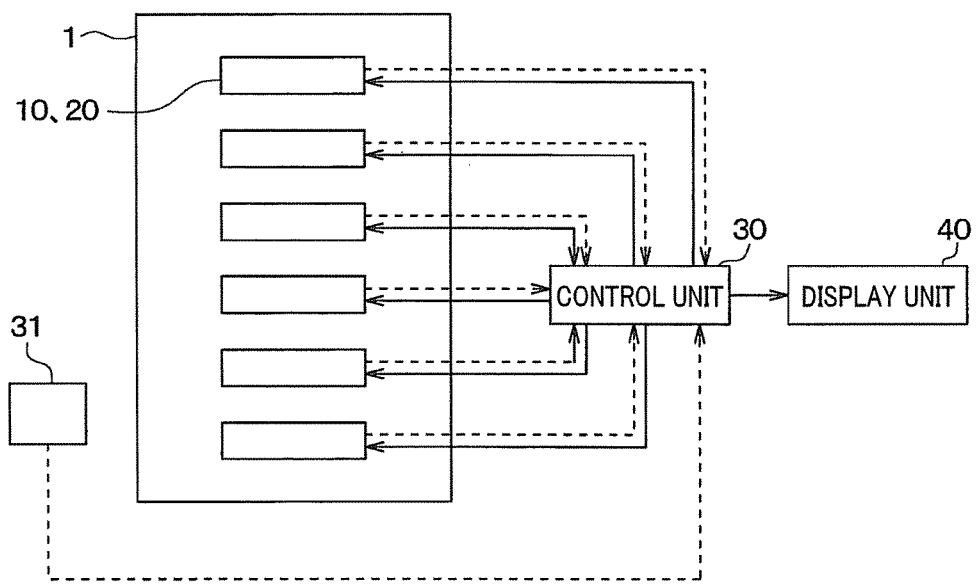
FIG. 17 is a diagram illustrating a configuration of a vehicle fuel meter according to a fourth embodiment.

As shown in FIG. 17, a vehicle fuel meter of the present embodiment is based on the vehicle fuel meter of the third embodiment, and additionally includes a temperature sensor 31, for reasons similar to those of the second embodiment. The rest of the configuration is similar to the third embodiment.

Figure 18:
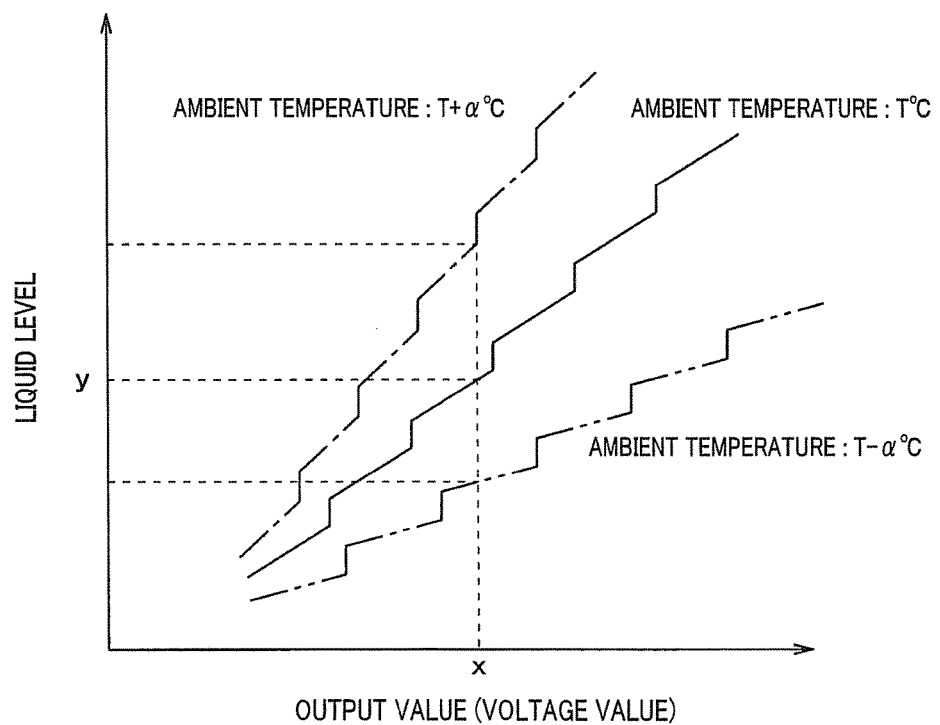
FIG. 18 is a diagram illustrating a relationship between an output value of the detecting elements illustrated in FIG. 17 and a liquid level, when ambient temperatures are T° C., T$-\alpha$° C., and T$+\alpha$° C.

Specifically, as shown in FIG. 18, a relationship between a liquid level and an output value (voltage value) of the detecting element 10 depends on the ambient temperature. Accordingly, in the present embodiment as well, as in the second embodiment, the liquid level is calculated based on an ambient temperature measured by the temperature sensor 31, a voltage value of the detecting element 10, and a relationship between a voltage value of the detecting element 10 and a liquid level, which corresponds to the ambient temperature. Thus, the liquid level can be detected correctly.

Further, in the present embodiment as well, as described in the second embodiment, a temperature sensor detecting an internal temperature of the vessel 1 may be additionally provided. In this case, one temperature sensor may be used, or two temperature sensors may be used, one being for detecting the temperature of the liquid 2 and one being for detecting the temperature of the gas 3. Thus, the liquid level can be calculated based on an ambient temperature, an internal temperature of the vessel, a voltage value of the detecting element 10, and a relationship between a voltage value of the detecting element 10 and a liquid level, which corresponds to the ambient temperature and the internal temperature of the vessel. In this way, a liquid level can be detected more correctly.

Fifth Embodiment

Figure 19:
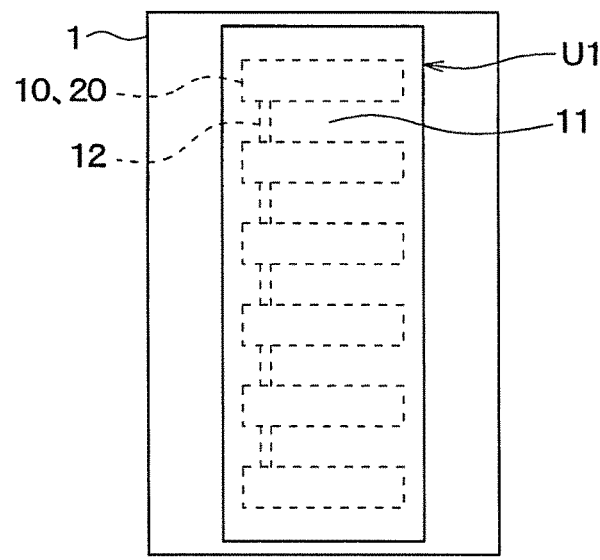
FIG. 19 is an external view illustrating a vessel and a sensor unit according to a fifth embodiment.
Figure 20:
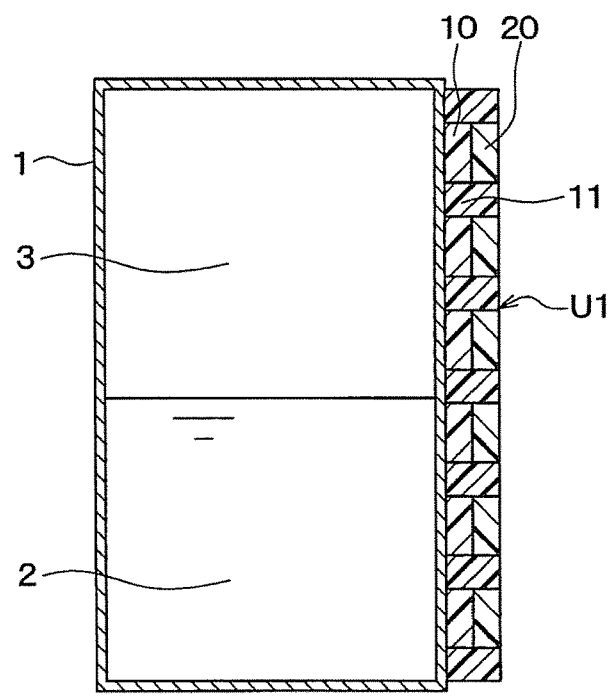
FIG. 20 is a cross-sectional view illustrating the vessel and the sensor unit illustrated in FIG. 19.

As shown in FIGS. 19 and 20, a vehicle fuel meter of the present embodiment is based on the vehicle fuel meter of the third or fourth embodiment. In the present embodiment, the plurality of sets of sensors 10 and 20 are integrated. The rest of the configuration is similar to the third and fourth embodiments.

The plurality of sets of sensors 10 and 20 have a structure in which these sets of sensors 10 and 20 are linked by a resinous part 11, and the detecting elements 10 are connected in series, while the Peltier elements 20 are also connected in series, via conductive foils 12 inside the resinous part 11. Thus, one sensor unit U1 is configured. Although not shown, the sensor unit U1 and the control unit 30 are electrically connected via wiring.

The resinous part 11 has a structure in which the insulating substrate 100, the front surface protective member 110, and the back surface protective member 120 shown in FIG. 4 are laminated, without being provided with the first and second interlayer connection members 130 and 140, and the front and back surface patterns 111 and 121 shown in FIG. 4. The conductive foils 12 correspond to the front and back surface patterns 111 and 121 of FIG. 4. Portions of the resinous part 11 where the respective conductive foils 12 are formed each have a structure in which the insulating substrate 100, the front surface protective member 110, and the back surface protective member 120 of FIG. 4 are laminated, without being provided with the first and second interlayer connection members 130 and 140 of FIG. 4. Further, portions of the resinous part 11 each have a structure in which the front surface patterns 111 are formed between the insulating substrate 100 and the front surface protective member 110, and the back surface patterns 121 are formed between the insulating substrate 100 and the back surface protective member 120.

This sensor unit can be fabricated by modifying the fabricating method shown in FIG. 6 to a method using a layout in which the plurality of sets of sensors 10 and 20 are connected in series via the front and back surface patterns 111 and 121, followed by batch-heating and batch-pressing.

In the present embodiment, the conductive foils 12 inside the sensor unit U1 connect the plurality of sets of sensors 10 and 20 in series. Thus, the number of lead wires can be reduced compared to the case where wiring such as of wires or cables is lead out from the plurality of sets of sensors 10 and 20.

Sixth Embodiment

Figure 21:
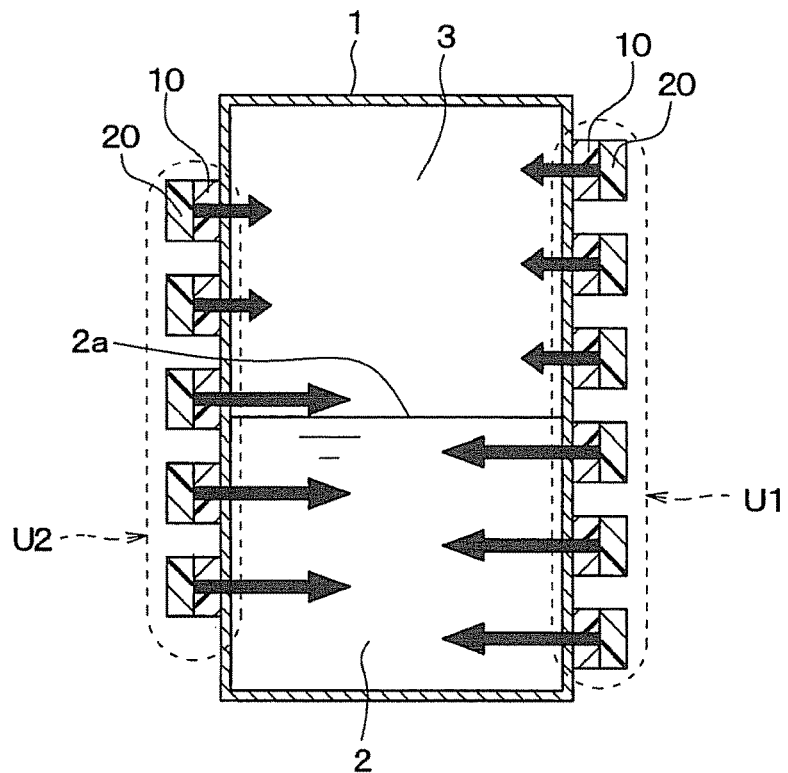
FIG. 21 is a cross-sectional view illustrating a vessel and sensor units according to a sixth embodiment.

As shown in FIG. 21, a vehicle fuel meter of the present embodiment is based on the vehicle fuel meter of the third embodiment. In the present embodiment, the number of sensor units has been changed from one to two. The rest of the configuration is similar the third embodiment.

The vehicle fuel meter of the present embodiment includes two sensor units U1 and U2. The sensor units U1 and U2 each have the same configuration as that of the sensor unit U1 described in the third embodiment. However, the first sensor unit U1 includes six sets of sensors 10 and 20, whereas the second sensor unit U2 includes five sets of sensors 10 and 20.

The first and second sensor units U1 and U2 are provided on different sidewalls of the vessel 1. In this case, the first and second sensor units U1 and U2 are provided so as to be displaced from each other in a height direction of the vessel 1 (up-and-down direction as viewed in the figure) such that a set of sensors 10 and 20 of one sensor unit is opposed to a position between adjacent sets of sensors 10 and 20 of the other sensor unit.

Figure 22:
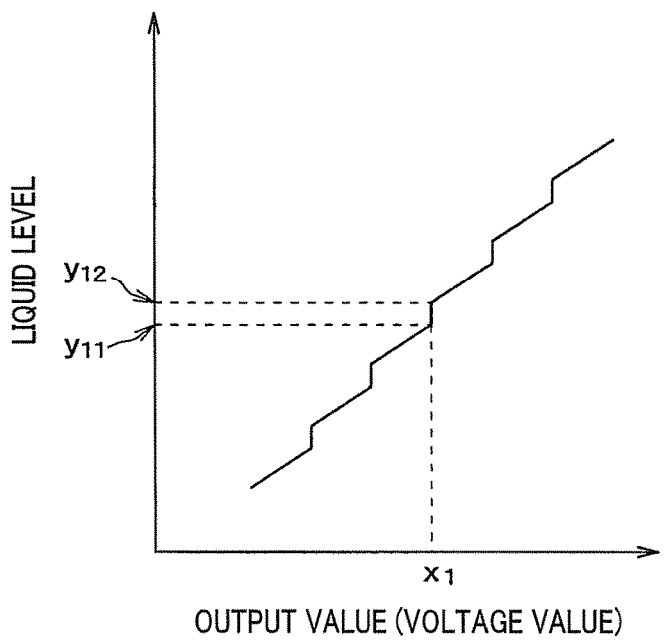
FIG. 22 is a diagram illustrating a relationship between a total output value of a plurality of detecting elements in a first sensor unit illustrated in FIG. 21 and a liquid level.

When only one sensor unit is used and the liquid level 2a is positioned between adjacent sets of sensors 10 and 20, there is a problem of not being able to detect the liquid level 2a with high accuracy. In other words, when only the first sensor unit U1 is used and the liquid level 2a is positioned between adjacent sets of sensors 10 and 20 as shown in FIG. 21, the liquid level corresponding to a total voltage value $x_1$ falls in a range of $y_{ii}$ to $y_{22}$ as shown in FIG. 22.

Figure 23:
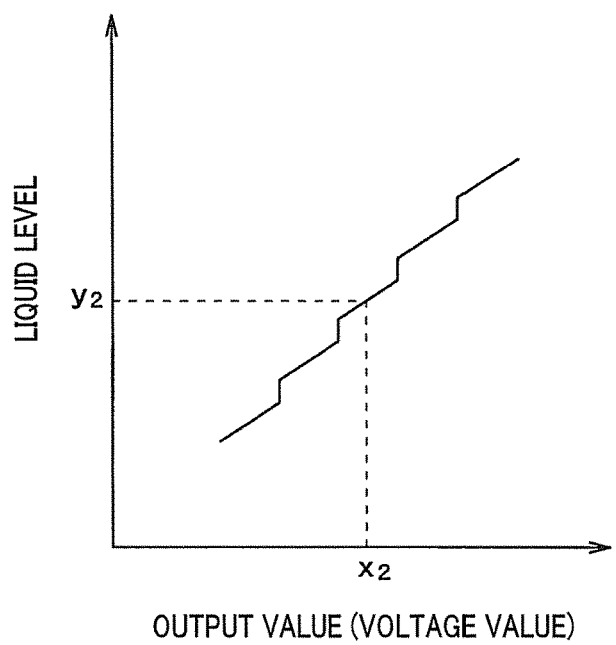
FIG. 23 is a diagram illustrating a relationship between a total output value of a plurality of detecting elements in a second sensor unit illustrated in FIG. 21 and a liquid level.

In contrast, in the present embodiment, the first and second sensor units U1 and U2 are provided on sidewalls of the vessel 1, being displaced. Therefore, as shown in FIG. 21, the liquid level 2a, which is at a position between adjacent sets of sensors 10 and 20 of the first sensor unit U1, will be at a position opposed to a set of sensor 10 and 20 of the second sensor unit U2. In this case, as shown in FIG. 23, the liquid level corresponding to the total voltage value $x_2$ of the second sensor unit U2 is pinpointed at $y_2$.

Therefore, in the present embodiment, if the voltage value x of the first sensor unit U1 is a voltage value obtained when the liquid level 2a is positioned between two sets of sensors 10 and 20, the liquid level y is calculated from the voltage value x of the second sensor unit U2. Otherwise, the liquid level y is calculated from the voltage value x of the first sensor unit U1. Thus, the liquid level 2a can be detected with high accuracy.

Seventh Embodiment

Figure 24A:
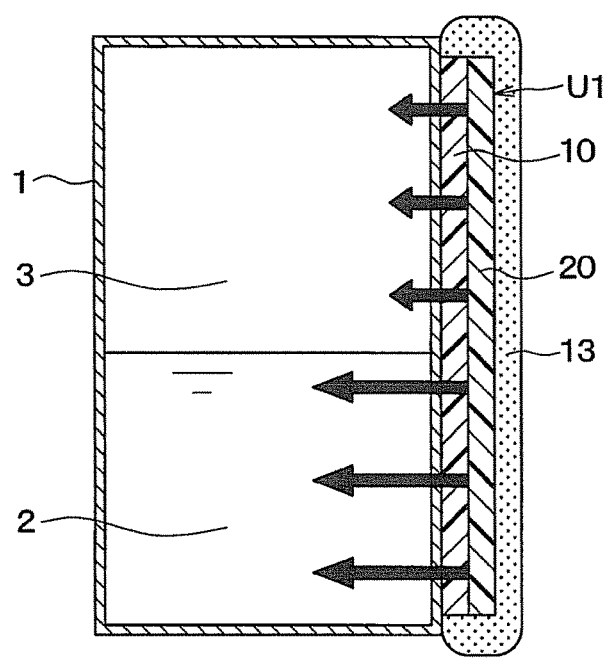
FIG. 24A is a cross-sectional view illustrating a vessel and a sensor unit according to a seventh embodiment.

As shown in FIG. 24A, a vehicle fuel meter of the present embodiment is based on the vehicle fuel meter of the first embodiment, and additionally includes a heat insulating member 13 covering the set of sensors 10 and 20. The rest of the configuration is similar to the first embodiment.

In the set of sensors 10 and 20, the heat insulating member 13 covers a portion except for a surface contacting the vessel 1. The heat insulating member 13 only needs to cover at least an opposite side of the vessel side of the set of sensor 10 and 20. As the heat insulating member 13, a fiber-based heat insulating material such as rock wool, a foam-based heat insulating material such as urethane foam, or the like can be used.

When the heat insulating member 13 is not provided to the set of sensors 10 and 20 and the ambient temperature varies due to airflow (wind), for example, generated around the sensors 10 and 20, the output of the detecting element 10 unavoidably varies.

In contrast, according to the present embodiment, the influence of the variations in ambient temperature can be reduced, and the output of the detecting element 10 can be stabilized. Accordingly, the detection accuracy of the liquid level can be enhanced.

Figure 24B:
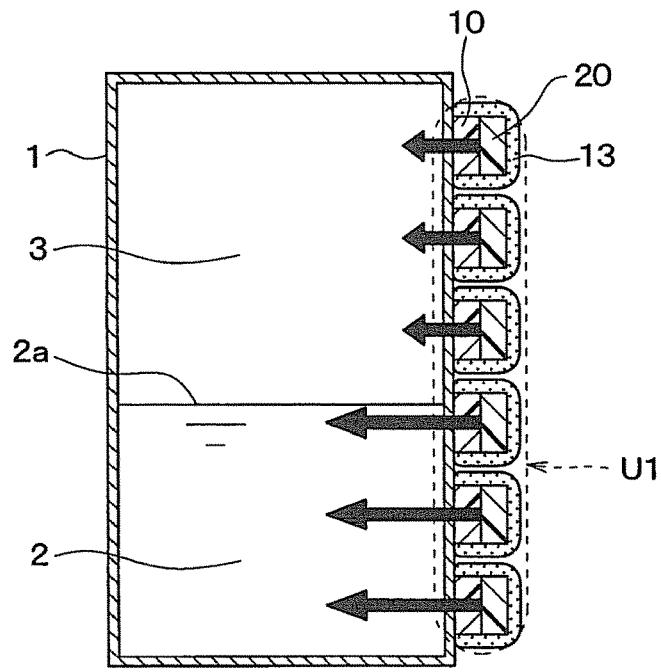
FIG. 24B is a cross-sectional view illustrating the vessel and the sensor unit according to the seventh embodiment.

In the third to sixth embodiments as well, the sensor unit U1 configured with a plurality of sets of sensors 10 and 20 can be covered with the heat insulating member 13, as in the present embodiment, to achieve the advantageous effects of the present embodiment. For example, as shown in FIG. 24B, each of the plurality of sets of sensors 10 and 20 is ensured to be covered with the heat insulating member 13. In this case, the heat insulating members 13 may be continuous between adjacent sets of sensors 10 and 20.

Eighth Embodiment

Figure 25:
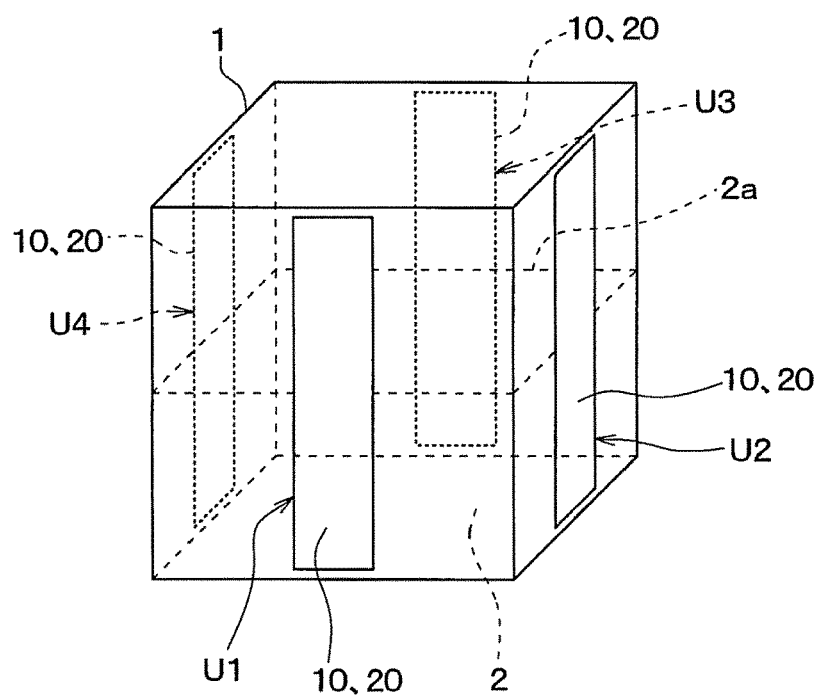
FIG. 25 is an external view illustrating a vessel and sensor units according to an eighth embodiment in a state where a liquid level is parallel to a bottom surface of the vessel.

As shown in FIG. 25, a vehicle fuel meter of the present embodiment is based on the vehicle fuel meter of the first embodiment, and includes an increased number of sensor units. The rest of the configuration is similar to the first embodiment.

In the present embodiment, four sensor units U1, U2, U3, and U4 are used. As in the first embodiment, each sensor unit is configured with one set of sensors 10 and 20. The sensor units U1 to U4 are provided on four respective sidewalls of the vessel 1. The detecting element 10 in each of the sensor units U1 to U4 outputs an electromotive voltage corresponding to a heat flow to the control unit 30.

Figure 26:
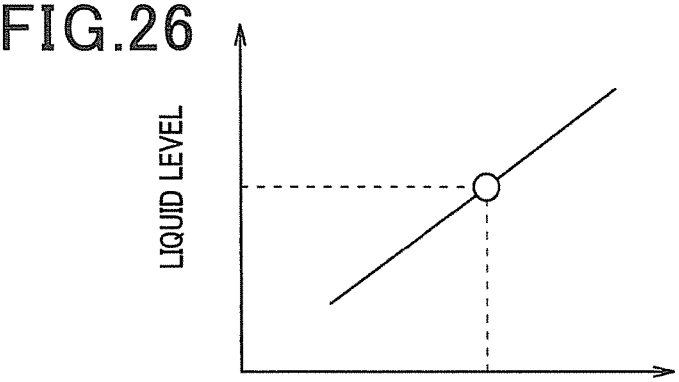
FIG. 26 is a diagram illustrating an example of an output value of the sensor units when the liquid level is as shown in FIG. 25.

As shown in FIG. 25, when the vessel 1 is not inclined, the liquid level 2a is parallel to the bottom surface of the vessel 1. Accordingly, as shown in FIG. 26, the four detecting elements 10 are equal in the output value. Based on the output value, the liquid level can be calculated and, based on the calculated liquid level and an inner bottom area of the vessel 1, a volume of the liquid 2 can be calculated.

Figure 27:
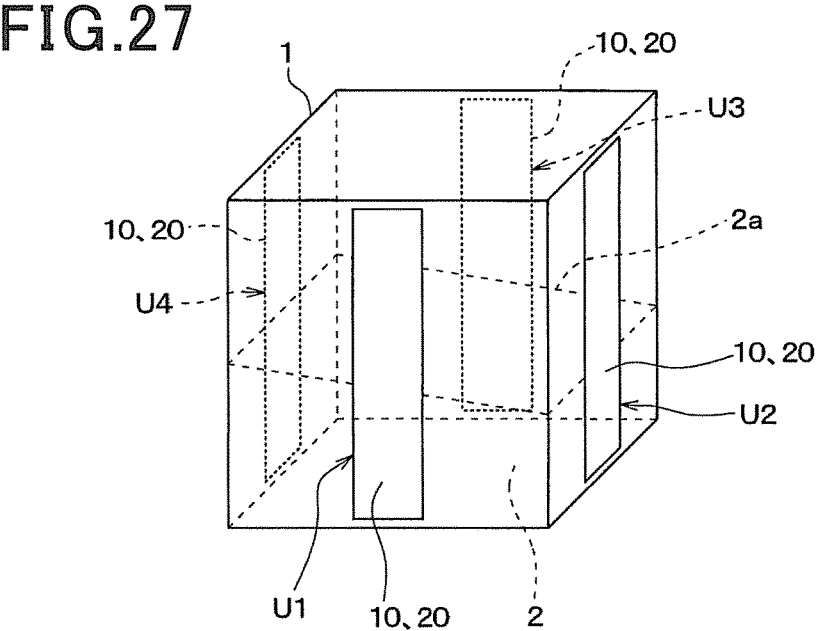
FIG. 27 is an external view illustrating the vessel and sensor units according to the eighth embodiment in a state where the liquid level is inclined relative to the vessel.
Figure 28:
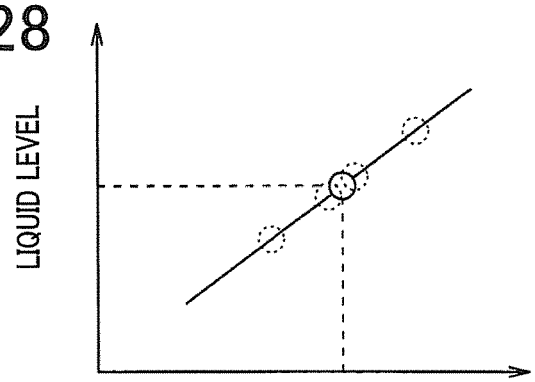
FIG. 28 is a diagram illustrating an example of an output value of the sensor units when the liquid level is as shown in FIG. 27.

On the other hand, as shown in FIG. 27, when the vessel 1 is inclined, the liquid level 2a is not parallel to, but inclined relative to, the bottom surface of the vessel 1. Accordingly, as shown by dashed lines in FIG. 28, the four detecting elements 10 provide different output values. In this case, the output values of the four detecting elements 10 can be averaged and, based on the averaged output value, the liquid level can be calculated and, based on the calculated liquid level and an inner bottom area of the vessel 1, a volume of the liquid 2 can be calculated. The liquid level mentioned here refers to a height in a height direction of the vessel 1, i.e. a height in a direction perpendicular to the bottom surface of the vessel 1.

Accordingly, the control unit 30 calculates a mean value of the output values of the detecting elements 10, and calculates the liquid level from the mean value. This method of calculating the liquid level is similar to the one in the first embodiment. Further, the control unit 30 calculates a volume of the liquid 2 from the calculated liquid level and the inner bottom area of the vessel. Then, the control unit 30 causes the display unit 40 to display the calculated volume of the liquid 2, as a residual amount of fuel.

Thus, according to the present embodiment, the plurality of sensor units U1 to U4 are provided on the respective sidewalls of the vessel 1. Accordingly, if the vessel 1 is inclined, the volume of the liquid 2 can be calculated.

In the present embodiment, the four sensor units U1 to U4 are provided on the four respective sidewalls of the vessel 1. However, the number and the location of the sensor units can be changed as desired according to the shape of the vessel 1. In short, to enable calculation of the volume of the liquid 2, what is only needed is to dispose a plurality of sensor units at respective positions on the outer surfaces of the sidewalls of the vessel 1, the positions corresponding to different liquid levels when the vessel 1 is inclined.

Ninth Embodiment

Figure 29:
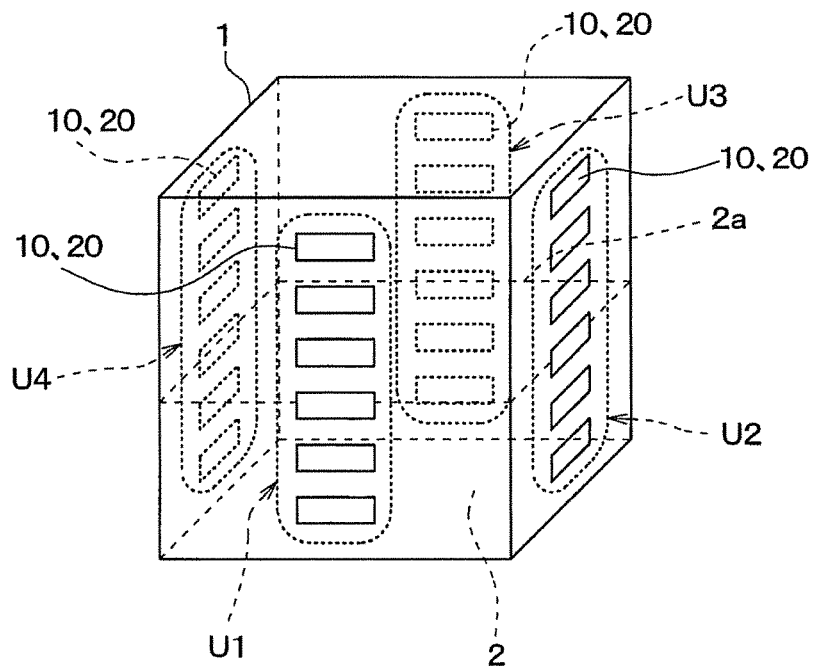
FIG. 29 is an external view illustrating a vessel and sensor units according to a ninth embodiment in a state where a liquid level is parallel to a bottom surface of the vessel.

As shown in FIG. 29, a vehicle fuel meter of the present embodiment is based on the vehicle fuel meter of the third embodiment, and includes an increased number of sensor units. The rest of the configuration is similar to the third embodiment.

In the present embodiment, taking a plurality of sets of sensors 10 and 20 juxtaposed in a height direction of the vessel 1 to be one sensor unit, four sensor units U1 to U4 are used. Each sensor unit is the same as each sensor unit of the third embodiment. The sensor units are provided on four respective sidewalls of the vessel 1. Each of the detecting elements 10 in each of the sensor units U1 to U4 outputs an electromotive voltage corresponding to a heat flow to the control unit 30.

As in the eighth embodiment, the control unit 30 calculates a mean value of the output values (voltage values) of the sensor units U1 to U4 and, based on the mean value, calculates the liquid level. The output values (voltage values) of the sensor units U1 to U4 correspond to a total output value (total voltage value) of the plurality of detecting elements 10 configuring the sensor units. Further, the control unit 30 calculates a volume of the liquid 2 from the calculated liquid level and an inner bottom area of the vessel. Then, the control unit 30 causes the display unit 40 to display the calculated volume of the liquid 2 as a residual amount of fuel.

Figure 30:
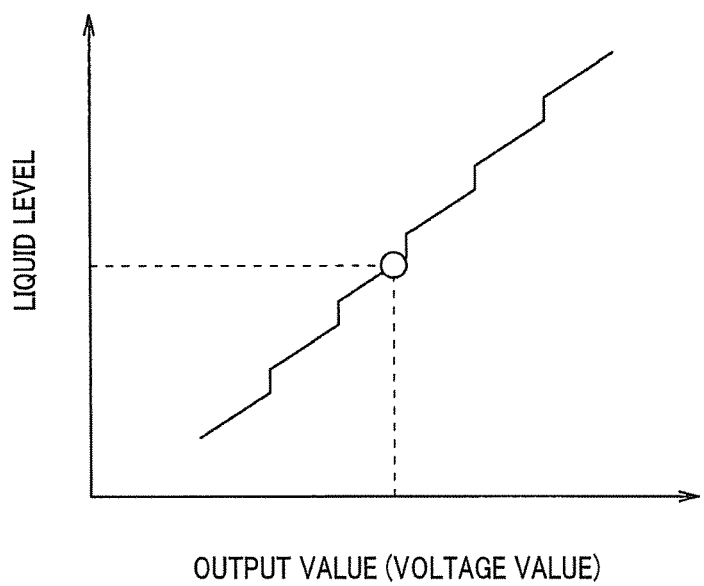
FIG. 30 is a diagram illustrating an example of an output value of the sensor units when the liquid level is as shown in FIG. 29.

As shown in FIG. 29, when the vessel 1 is not inclined, the liquid level 2*a* is parallel to the bottom surface of the vessel 1. Accordingly, as shown in FIG. 30, the output values of the four sensor units U1 to U4 are the same. Based on a mean value of the output values, the liquid level can be calculated and, based on the calculated liquid level and an internal bottom area of the vessel 1, a volume of the liquid 2 can be calculated.

Figure 31:
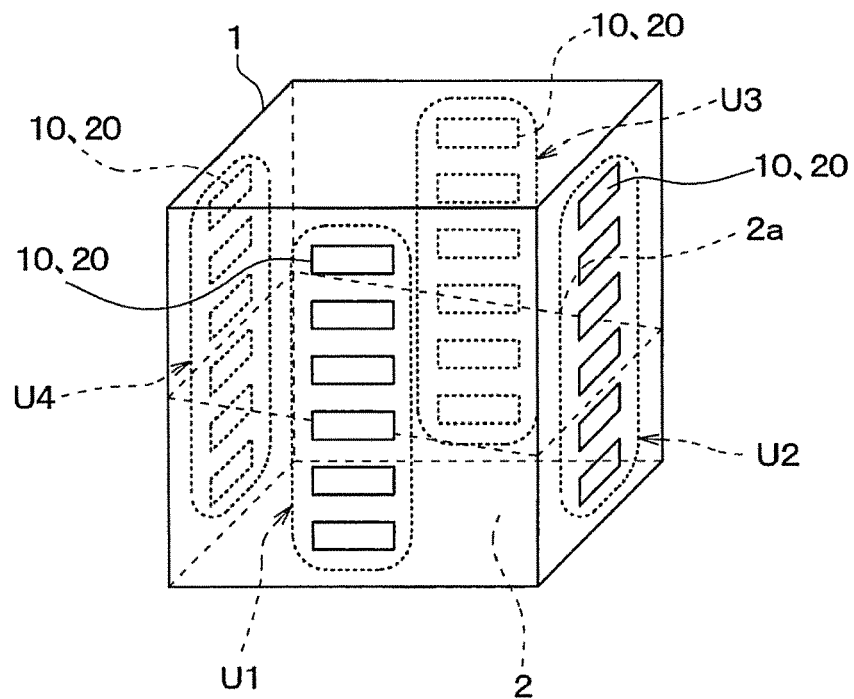
FIG. 31 is an external view illustrating the vessel and sensor units according to the ninth embodiment in a state where the liquid level is inclined relative to the bottom surface of the vessel.
Figure 32:
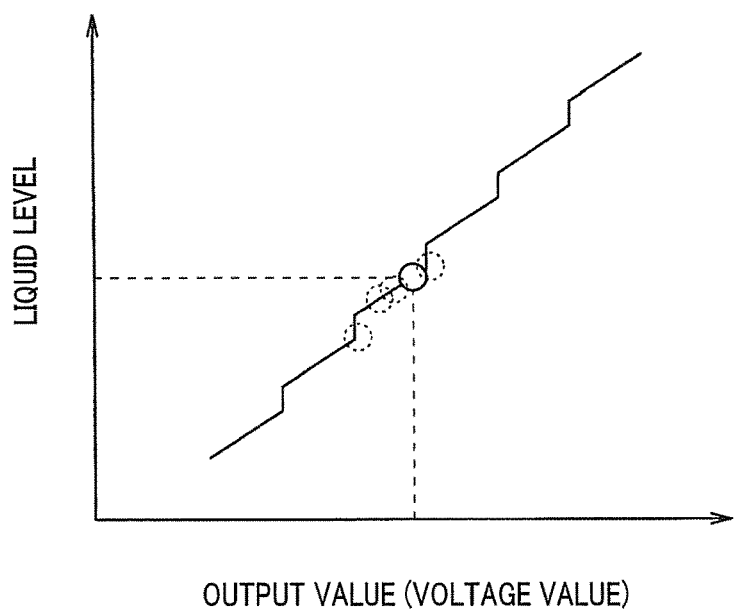
FIG. 32 is a diagram illustrating an example of an output value of the sensor units when the liquid level is as shown in FIG. 31.

As shown in FIG. 31, when the vessel 1 is inclined, the liquid level 2*a* is not parallel to, but inclined relative to, the bottom surface of the vessel 1. Accordingly, as shown by dashed lines in FIG. 32, the four sensor units U1 to U4 provide different output values. In this case, the output values of the four sensor units U1 to U4 can be averaged and, and based on the averaged output value, the liquid level can be calculated and further, based on the calculated liquid level and an inner bottom area of the vessel 1, a volume of the liquid 2 can be calculated.

Since the plurality of sensor units U1 to U4 are used in the present embodiment as well, a volume of the liquid 2 can be calculated, as in the eighth embodiment, if the vessel 1 is inclined.

In the present embodiment, the four sensor units U1 to U4 are provided on the four respective sidewalls of the vessel 1. However, the number and the location of the sensor units can be changed as desired according to the shape of the vessel 1. In short, to enable calculation of the volume of the liquid 2, what is only needed is to dispose a plurality of sensor units at positions on the outer surfaces of the sidewalls of the vessel 1, the positions corresponding to different liquid levels when the vessel 1 is inclined.

In the present embodiment, it is preferable, as in the sixth embodiment, that two or more optionally selected sensor units among the plurality of sensor units are disposed being displaced from each other in a height direction of the vessel 1, such that a set of sensors 10 and 20 in one sensor unit is opposed to a position between adjacent sets of sensors 10 and 20 in another sensor unit.

Tenth Embodiment

Figure 33:
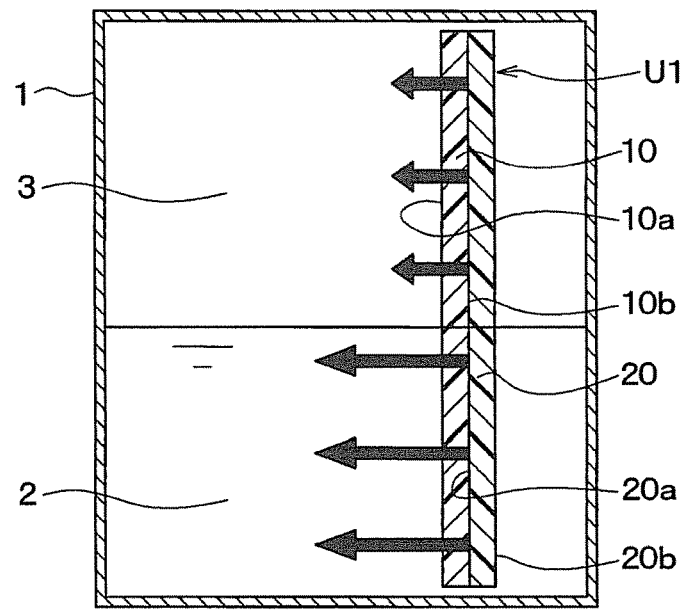
FIG. 33 is a cross-sectional view illustrating a vessel and a sensor unit according to a tenth embodiment.

As shown in FIG. 33, a vehicle fuel meter of the present embodiment is based on the vehicle fuel meter of the first embodiment, with the location of the sensor unit U1 being changed. The rest of the configuration is similar to the first embodiment.

In the present embodiment, the sensor unit U1, which is configured with one set of sensors 10 and 20, is provided inside the vessel 1. When the liquid 2 is contained in the vessel 1, part of or entire sensor unit U1 will be immersed in the liquid 2.

In the present embodiment as well, a heat generated from the surface 20*a* of the Peltier element 20 forms a heat flow passing through the detecting element 10 from the surface 10*b* to the surface 10*a* of the detecting element 10, toward the liquid 2 or the gas 3 in the vessel. Then, the control unit 30 can execute a control process similar to that of the first embodiment to detect the liquid level.

According to the present embodiment, since the sensor unit U1 is provided inside the vessel 1, there is no concern that the sensors 10 and 20 may fall off from the vessel 1, and further, the external shape of the vessel 1 can remain unchanged. Moreover, according to the present embodiment, since the sensor unit U1 is provided inside the vessel 1, the liquid level can be easily detected if the vessel 1 is in a distorted shape.

In the present embodiment as well, the liquid level can be calculated based on the ambient temperature and the like as in the second embodiment. Accordingly, the liquid level can be correctly detected.

Eleventh Embodiment

Figure 34:
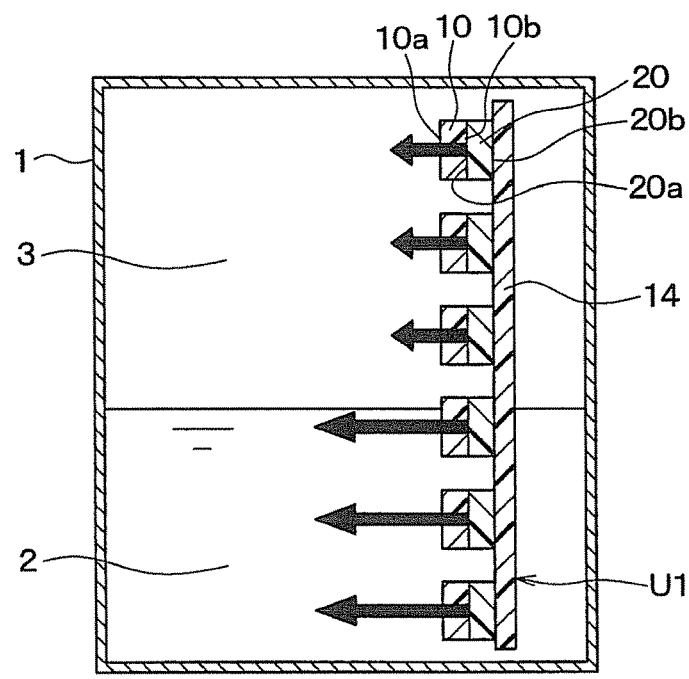
FIG. 34 is a cross-sectional view illustrating a vessel and a sensor unit according to an eleventh embodiment.

As shown in FIG. 34, a vehicle fuel meter of the present embodiment is based on the vehicle fuel meter of the third embodiment, with the location of the sensor unit U1 being changed. The rest of the configuration is similar to the third embodiment.

In the present embodiment, the six sets of sensors 10 and 20 are provided inside the vessel 1 in a state of being supported by a supporting member 14. The plurality of sets of sensors 10 and 20 juxtaposed in a height direction of the vessel 1 configure one sensor unit U1. The supporting member 14 is made of a resin, with the six sensors 10 and 20 being stuck thereto. The supporting member 14 may be formed of a different material.

In the present embodiment as well, a heat generated in the surface 20*a* of the Peltier element 20 forms a heat flow passing through the detecting element 10 from the surface 10*b* to the surface 10*a* of the detecting element 10, toward the liquid 2 or the gas 3 in the vessel. Then, the control unit 30 can execute a control process similar to that of the third embodiment to detect a liquid level.

According to the present embodiment, since the sensor unit U1 is provided inside the vessel 1, the same advantageous effects as those of the tenth embodiment can be obtained.

When the location of the sensor unit(s) is changed to the inside of the vessel 1 in the vehicle fuel meter of the fourth to seventh embodiments, as in the present embodiment, the liquid level can also be detected.

Twelfth Embodiment

Figure 35A:
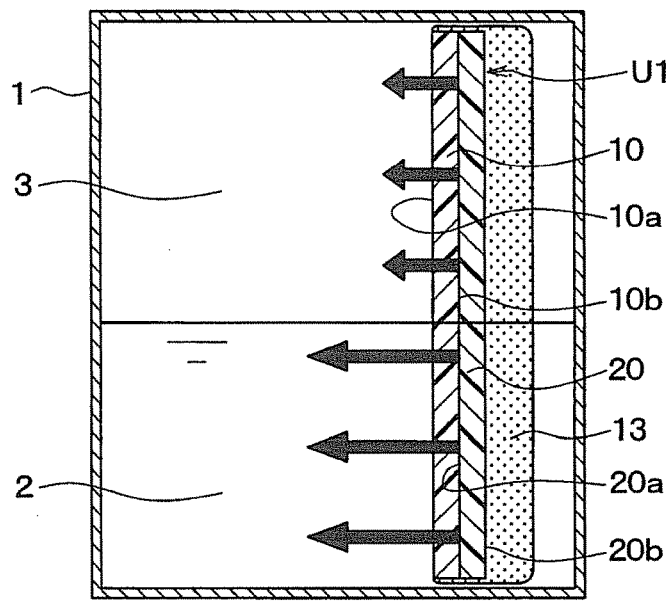
FIG. 35A is a cross-sectional view illustrating a vessel and a sensor unit according to a twelfth embodiment.

As shown in FIG. 35A, a vehicle fuel meter in the present embodiment is based on the vehicle fuel meter of the tenth embodiment, and additionally includes a heat insulating member 13 covering the sensor unit U1. The rest of the configuration is similar to the tenth embodiment.

In the sensor unit U1 configured with one set of sensors 10 and 20, the heat insulating member 13 covers a portion excepting the surface 10*a* of the detecting element 10. The heat insulating member 13 only needs to cover at least the surface 20*b* of the Peltier element 20. As the heat insulating member 13, one similar to the heat insulating member 13 of the seventh embodiment can be used. To prevent entry of the liquid into the heat insulating member 13, a front surface of the heat insulating member 13 may be covered with a covering layer.

Figure 36:
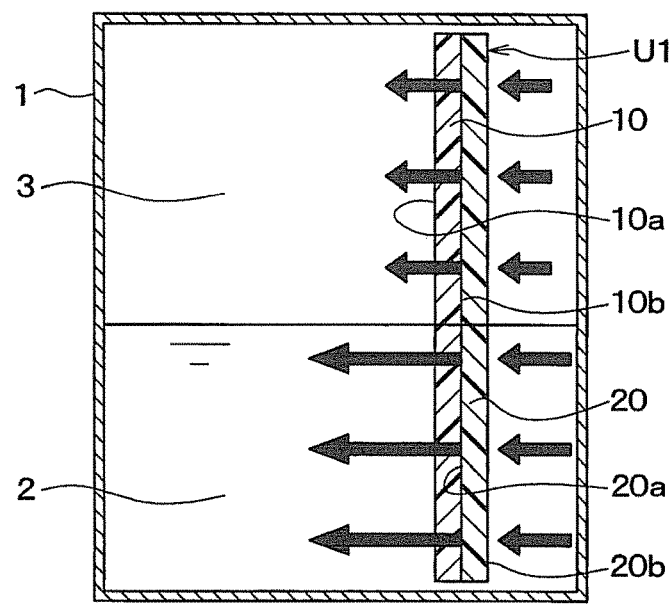
FIG. 36 is a cross-sectional view illustrating a vessel and a sensor unit for showing a problem to be solved by the twelfth embodiment.

As shown in FIG. 36, when the heat insulating member 13 is not provided to the sensor unit U1, the surface 20b of the Peltier element 20 serves as a heat absorbing surface. Accordingly, as indicated by the thick arrows in FIG. 36, a heat flow is generated, flowing from the liquid 2 or the gas 3 toward the surface 20b of the Peltier element 20. The heat flow generates noise, making the output of the detecting element 10 unstable. In other words, the noise influences the heat flow passing through the detecting element 10, deteriorating detection accuracy of liquid level.

In contrast, the present embodiment can minimize generation of heat flow flowing from the liquid 2 or the gas 3 toward the surface 20b of the Peltier element 20. Accordingly, the detection accuracy of the liquid level can be further improved compared with the case of not providing the heat insulating member 13 to the sensor unit U1.

Figure 35B:
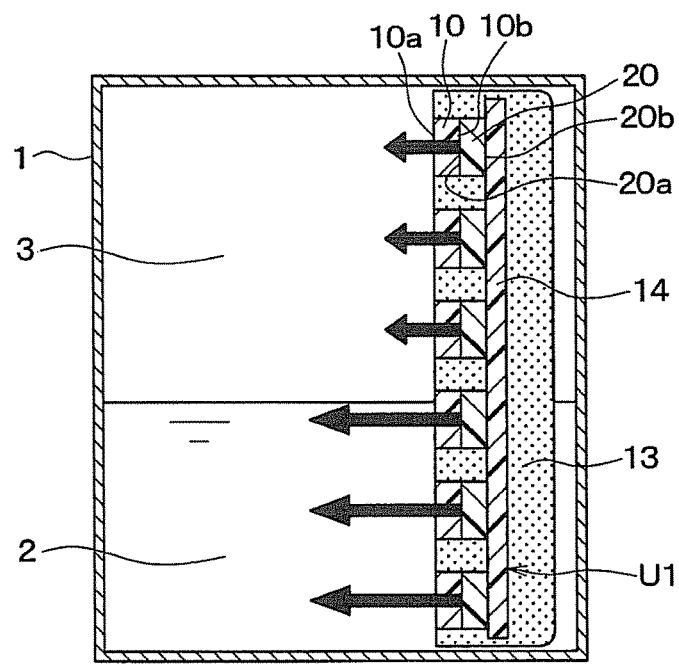
FIG. 35B is a cross-sectional view illustrating the vessel and the sensor unit according to the twelfth embodiment.

As shown in FIG. 35B, when the sensor unit U1 configured with the plurality of sets of sensors 10 and 20 is covered with the heat insulating member 13 in the eleventh embodiment, as in the present embodiment, the advantageous effects of the present embodiment can be obtained.

Thirteenth Embodiment

Figure 37:
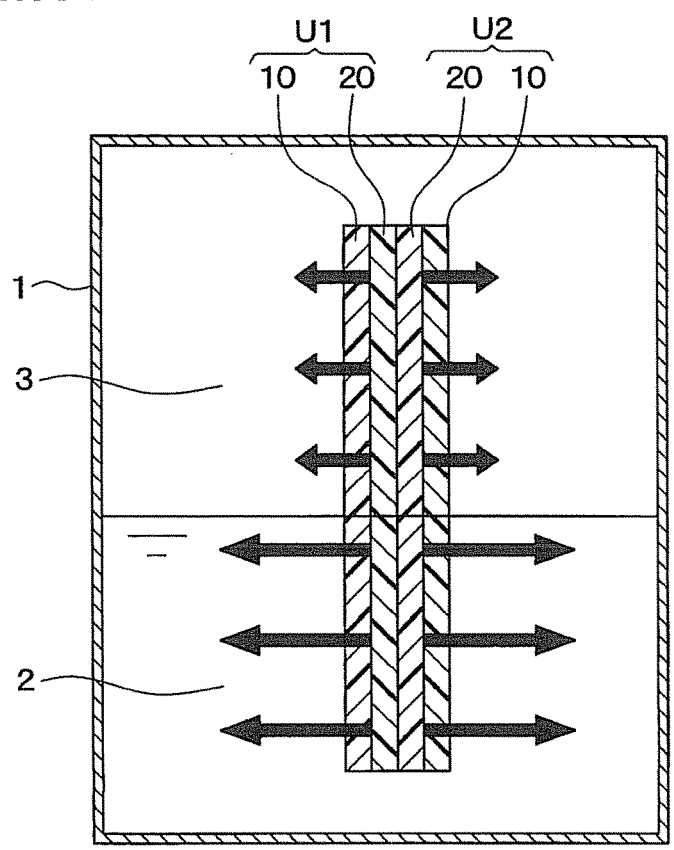
FIG. 37 is a cross-sectional view illustrating a vessel and sensor units according to a thirteenth embodiment.

As shown in FIG. 37, a vehicle fuel meter of the present embodiment is based on the vehicle fuel meter of the tenth embodiment, and has a configuration in which two sensor units are laminated. The rest of the configuration is similar to the tenth embodiment.

In the present embodiment, two sensor units U1 and U2 are used. The sensor units U1 and U2 are each configured with one set of sensors 10 and 20. The two sensor units U1 and U2 are laminated to each other, with their Peltier element 20 sides being located inward.

According to this, as in the twelfth embodiment, generation of heat flow flowing from the liquid 2 or the gas 3 toward the surface 20b of the Peltier element 20 can be minimized. Further, according to the present embodiment, the output of the detecting elements 10 is increased by a factor of two compared with the case of using one sensor unit. Accordingly, an S/N ratio (signal/noise ratio) is increased, and the detection accuracy of the liquid level is improved.

When two sensor units U1, each being configured with the plurality of sets of sensors 10 and 20, are laminated in the eleventh embodiment, as in the present embodiment, the advantageous effects of the present embodiment can be obtained.

Fourteenth Embodiment

Figure 38:
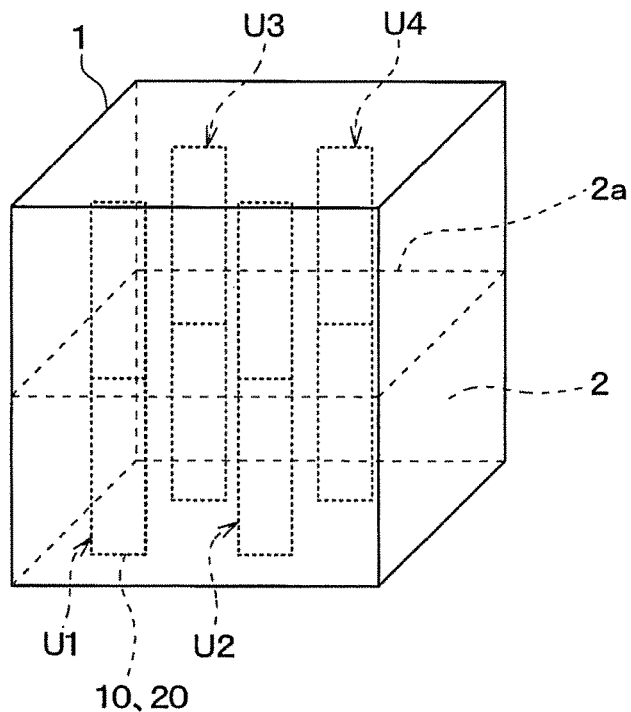
FIG. 38 is an external view illustrating a vessel and sensor units according to a fourteenth embodiment in a state where a liquid level is parallel to a bottom surface of the vessel.

As shown in FIG. 38, a vehicle fuel meter of the present embodiment is based on the vehicle fuel meter of the tenth embodiment, with the number of the sensor units being increased. The rest of the configuration is similar to the tenth embodiment.

In the present embodiment, the four sensor units U1, U2, U3, and U4 are provided inside the vessel 1, being spaced apart from each other. The detecting element 10 in each of the sensor units U1 to U4 outputs an electromotive voltage corresponding to a heat flow to the control unit 30.

Figure 39:
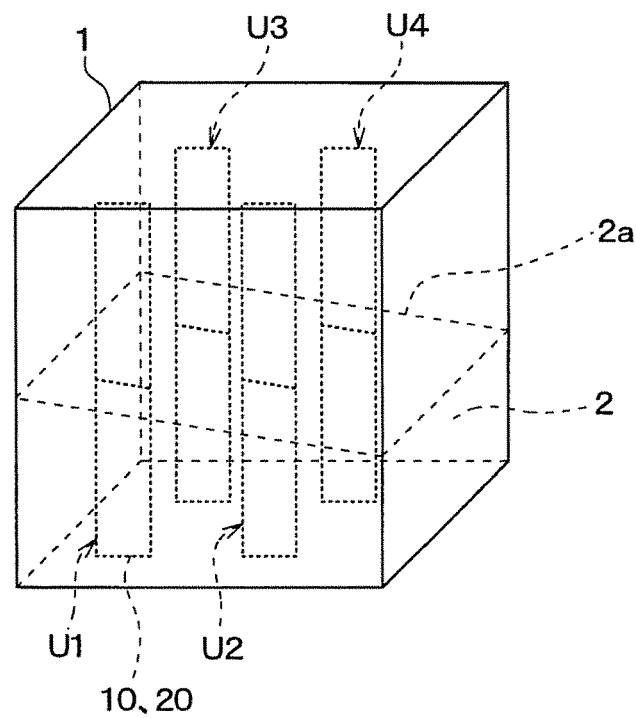
FIG. 39 is an external view illustrating the vessel and sensor units according to the fourteenth embodiment in a state where the liquid level is inclined relative to the bottom surface of the vessel.

The present embodiment is based on the eighth embodiment in which the sensor units U1 to U4 are provided to the four respective sidewalls of the vessel 1, with the location of the sensor units U1 to U4 being changed to the inside of the vessel 1. Therefore, according to the present embodiment, if the vessel 1 is inclined as shown in FIG. 39, a volume of the liquid 2 can be calculated as in the eighth embodiment.

According to the present embodiment, since the plurality of sensor units U1 to U4 are located inside the vessel 1, if the vessel 1 is in a distorted shape, a volume of the liquid 2 can be easily calculated.

Fifteenth Embodiment

Figure 40:
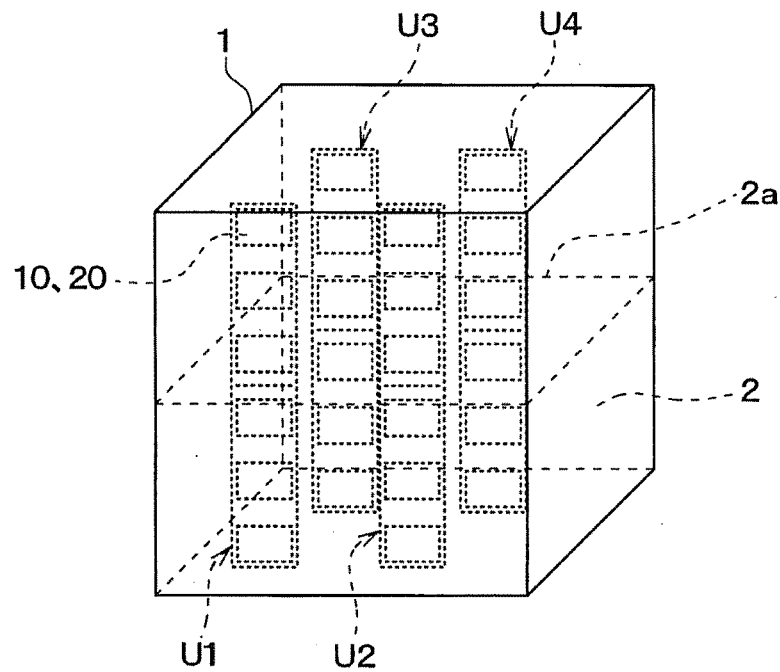
FIG. 40 is an external view illustrating a vessel and sensor units according to a fifteenth embodiment in a state where a liquid level is parallel to the bottom surface of the vessel.

As shown in FIG. 40, a vehicle fuel meter of the present embodiment is based on the vehicle fuel meter of the eleventh embodiment, with the number of the sensor units being increased. The rest of the configuration is similar to the eleventh embodiment.

In the present embodiment, four sensor units U1, U2, U3, and U4 are provided inside the vessel 1, being spaced apart from each other. The detecting elements 10 in each of the sensor units U1 to U4 output an electromotive voltage corresponding to a heat flow to the control unit 30.

Figure 41:
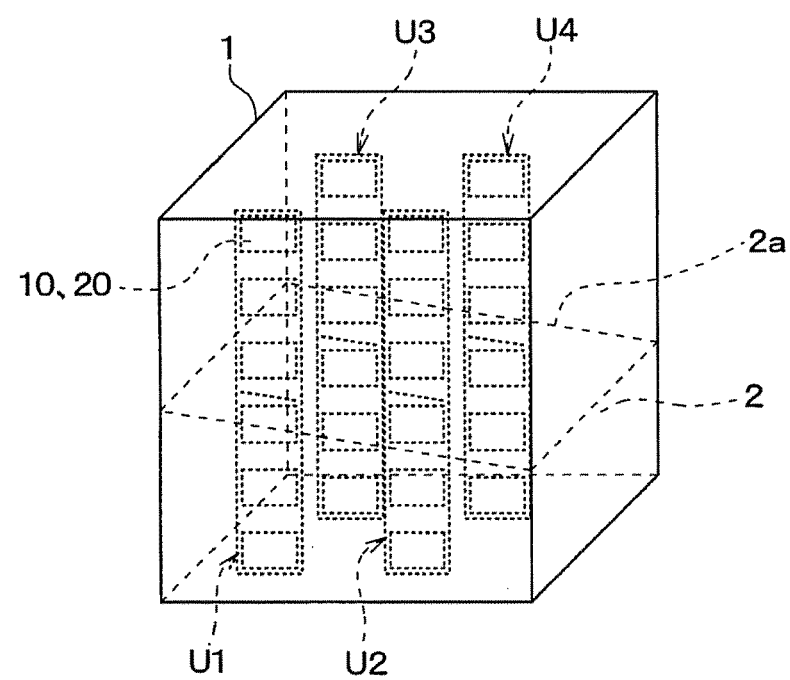
FIG. 41 is an external view illustrating the vessel and sensor units according to the fifteenth embodiment in a state where the liquid level is inclined relative to the bottom surface of the vessel.

The present embodiment is based on the ninth embodiment in which the sensor units U1 to U4 are provided to the four respective sidewalls of the vessel 1, with the location of the sensor units being changed to the inside of the vessel 1. Therefore, according to the present embodiment, if the vessel 1 is inclined as shown in FIG. 41, a volume of the liquid 2 can be calculated as in the ninth embodiment.

According to the present embodiment, since the plurality of sensor units U1 to U4 are located inside the vessel 1, if the vessel 1 is in a distorted shape, a volume of the liquid 2 can be easily calculated.

The present embodiment can be combined with the fourth to seventh embodiments.

OTHER EMBODIMENTS

The present disclosure is not limited to the foregoing embodiments, but can be appropriately changed as follows within the scope of the claims.

(1) In the foregoing embodiments, the length of the Peltier element 20 in a height direction of the vessel 1 is equal to that of the detecting element 10. However, the length of the Peltier element 20 may be different from that of the detecting element 10, as long as a heat flow can be formed, passing through the detecting element 10 toward the liquid 2 or the gas 3.

(2) In the foregoing embodiments, the Peltier element 20 having the same structure as that of the detecting element 10 is used as the heating means. However, the Peltier element having a different structure may be used. Alternatively, other heating means (heaters), such as an electric heater, may be used.

(3) In the foregoing embodiments, the liquid level detector of the present disclosure is applied to the vehicle fuel meter. However, the liquid level detector of the present disclosure can also be applied to other usages. For example, the liquid level detector of the present disclosure can be applied to the bath level detector that detects a bath level of a molten metal described in Patent Literature 1.

(4) In the foregoing embodiments, the vessel 1 is a closed vessel. However, the liquid level detector of the present disclosure can detect a liquid level if the vessel 1 is an open vessel, as in the foregoing embodiments.

(5) In the foregoing embodiments, a liquid level of the liquid 2 contained in the vessel 1 is detected. However, the liquid level detector of the present disclosure can be used, with the sensor unit being immersed in a liquid. This enables detection of the liquid level of a liquid not contained in the vessel 1, such as a tidal water level of rivers or the sea.

(6) In the foregoing embodiments, the control unit 30 calculates a liquid level on the basis of the electromotive voltage (voltage value) generated in the detecting element 10. However, a liquid level may be calculated based on a current value, instead of the voltage value. In short, the detecting element 10 is ensured to generate an electromotive force corresponding to a heat flow passing though the detecting element 10, and output an electrical signal corresponding to the electromotive force to the control unit 30. Accordingly, the control unit 30 can calculate a liquid level on the basis of the output value of the detecting element 10, and a relationship between an output value of the detecting element 10 and a liquid level.

(7) In the foregoing embodiments, the metals forming the first and second interlayer connection members 130 and 140 are a Bi—Sb—Te alloy and a Bi—Te alloy, respectively. However, other alloys may be used. In the foregoing embodiments, both of the metals forming the first and second interlayer connection members 130 and 140 are solid-phase sintered alloys. However, what is only needed is that at least one of the metals is a solid-phase sintered alloy. Thus, the electromotive force can be made larger compared with the case where neither of the metals forming the first and second interlayer connection members 130 and 140 is solid-phase sintered. Accordingly, the detecting element 10 can be made highly sensitive.

(8) The foregoing embodiments are relevant to each other, and thus can be combined with each other as appropriate, unless the combination is obviously impossible. As a matter of course, in the foregoing embodiments, the elements configuring the embodiments are not necessarily essential, unless, for example, explicitly indicated as being particularly essential and considered to be obviously essential in principle.

REFERENCE SIGNS LIST

1: vessel, 10: detecting element, 13: heat insulating member, 20: Peltier element, 30: control unit (detection processing means), 100: insulating substrate, 101, 102: first and second via holes, 130, 140: first and second interlayer connection members.

What is claimed is:

1. A liquid level detector, comprising:
a detecting element having a first surface and a second surface opposite to the first surface, the first surface being opposed to a liquid to be detected, while being parallel to a height direction of liquid level;
a heating means provided to the second surface of the detecting element, the heating means being located on an outer side of the detecting element other than a side to which the first surface is opposed to detect the liquid;
a detection processing means performing a detection process for a liquid level of the liquid;
a single sensor unit configured with the detecting element, a length of the detecting element in a height direction of liquid level being equal to a detection range of liquid level;
a plurality of pairs of first and second via holes formed in the detecting element and penetrating an insulating substrate of a thermoplastic resin in a thickness direction; and
a plurality of pairs of first and second interlayer connection members provided for the pairs of first and second via holes, and embedded in the pairs of first and second via holes, the first interlayer connection members are formed of a different type of metal than the second interlayer connection members, wherein:
the heating means forms a heat flow passing through the detecting element from the second surface to the first surface, toward the liquid or a gas;
the detecting element has a structure in which the plurality of pairs of the first and second interlayer connection members are alternately connected in series;
the detecting element generates, in the first and second interlayer connection members alternately connected in series, an electromotive force corresponding to the heat flow passing through the detecting element, and outputs an electrical signal corresponding to the electromotive force to the detection processing means; and the detection processing means calculates a liquid level on the basis of an output value of the detecting element, and a relationship between an output value of the detecting element and a liquid level.

2. A liquid level detector, comprising:
a plurality of detecting elements each having a first surface and a second surface opposite to the first surface, the first surface being opposed to a liquid to be detected, while being parallel to a height direction of liquid level;
a heating means provided to the second surface of each of the plurality of detecting elements, the heating means being located on an outer side of the detecting element other than a side to which the first surface is opposed to detect the liquid;
a detection processing means performing a detection process for a liquid level of the liquid;
a single sensor unit configured with the plurality of detecting elements, the plurality of detecting elements being juxtaposed in a height direction of liquid level across a detection range of liquid level;
a plurality of pairs of first and second via holes formed in each of the plurality of detecting elements and penetrating an insulating substrate of a thermoplastic resin in a thickness direction; and
a plurality of pairs of first and second interlayer connection members provided for the pairs of first and second via holes, and embedded in the pairs of first and second via holes, the first interlayer connection members are formed of a different type of metal than the second interlayer connection members, wherein:
the heating means forms a heat flow passing through each of the plurality of detecting elements from the second surface to the first surface, toward the liquid or a gas;
each of the detecting elements has a structure in which the plurality of pairs of the first and second interlayer connection members are alternately connected in series;
each of the detecting elements generates, in the first and second interlayer connection members alternately connected in series, an electromotive force corresponding to the heat flow passing through the detecting element, and outputs an electrical signal corresponding to the electromotive force to the detection processing means; and
the detection processing means calculates a liquid level on the basis of a total output value of the plurality of detecting elements, and a relationship between a total output value of the plurality of detecting elements and a liquid level.

3. The liquid level detector according to claim 1, wherein at least metal forming the first and second interlayer connection members is a sintered alloy sintered in a state where a plurality of metal atoms maintain a crystal structure of the metal atoms.

4. The liquid level detector according to claim 1, wherein the heating means is a Peltier element having the same structure as that of the detecting element and integrated with the detecting element.

5. The liquid level detector according to claim 1, wherein the sensor unit is provided to an outer surface of a sidewall of a vessel containing the liquid.

6. The liquid level detector according to 1, wherein the sensor unit is provided inside a vessel containing the liquid.

7. The liquid level detector according to claim 6, wherein two sensor units are laminated, with heating means sides of the two sensor units being located inward.

8. The liquid level detector according to 1, wherein the sensor unit comprises a heat insulating member covering a heating means side.

9. The liquid level detector according to 1, wherein a plurality of the sensor units are provided at positions corresponding to different liquid levels when the vessel is inclined.

* * * * *